United States Patent [19]
Tsuji et al.

[11] Patent Number: 5,196,702
[45] Date of Patent: Mar. 23, 1993

[54] PHOTO-SENSOR AND METHOD FOR OPERATING THE SAME

[75] Inventors: Kazutaka Tsuji, Hachioji; Tadaaki Hirai, Kogenei; Yukio Takasaki, Kawasaki; Haruo Itoh, Hino; Tetshuhiko Takahashi, Tokyo; Kenichi Okajima, Houyua, all of Japan

[73] Assignee: Hitachi, Ltd., Tokyo, Japan

[21] Appl. No.: 824,857

[22] PCT Filed: Oct. 21, 1988

[86] PCT No.: PCT/JP88/01073
§ 371 Date: Aug. 21, 1989
§ 102(e) Date: Aug. 21, 1989

[87] PCT Pub. No.: WO89/04063
PCT Pub. Date: May 5, 1989

Related U.S. Application Data

[63] Continuation of Ser. No. 415,301, Aug. 21, 1989, abandoned.

[30] Foreign Application Priority Data

Oct. 21, 1987 [JP] Japan ................ 62-263797
Mar. 9, 1988 [JP] Japan ................ 63-55892

[51] Int. Cl.$^5$ .................................. H01L 31/0272
[52] U.S. Cl. ...................................... 250/327.2
[58] Field of Search ............................. 250/327.2

[56] References Cited

U.S. PATENT DOCUMENTS

| | | | |
|---|---|---|---|
| 3,069,551 | 12/1962 | Haine | 250/213 R |
| 4,268,750 | 5/1981 | Cowart | 250/315.3 |
| 4,535,468 | 8/1985 | Kempter | 250/327.2 X |
| 4,547,670 | 10/1985 | Sugimoto et al. | 250/370 |
| 4,554,453 | 11/1985 | Feigt et al. | 250/327.2 |
| 4,810,881 | 3/1989 | Berger et al. | 250/370.01 |
| 4,980,736 | 12/1990 | Takasaki et al. | 357/30 |
| 4,982,095 | 1/1991 | Takahashi et al. | 250/367 |
| 5,023,896 | 6/1991 | Yokouchi et al. | 378/99 |
| 5,059,794 | 10/1991 | Takahashi et al. | 250/327.2 |
| 5,101,255 | 3/1992 | Ishioka et al. | 357/30 |

Primary Examiner—Constantine Hannaher
Attorney, Agent, or Firm—Kenyon & Kenyon

[57] ABSTRACT

An optically reading type photo-sensor for reading out an information signal of a signal light with a signal reading light includes a first photoconductor (101) and a second photoconductor (102) interposed between two electrodes (104 and 105); an intermediate region (103) disposed between those two photoconductors for storing and recombining carriers; and an optical source (107) for emitting a signal reading light for uninformalizing the potential in said second photoconductor (102), whereby a successive signal reading can be accomplished without any special preparations for the incidence of the signal light. The photo-sensor can be applied to a variety of imaging devices.

6 Claims, 12 Drawing Sheets

| SYSTEM | SIGNAL CHARGE | NOTE |
|---|---|---|
| EXAMPLE FOR COMPARISON 1 | 0.02 fkex | $\eta/E_0 = 50eV$ |
| EXAMPLE FOR COMPARISON 2 | 0.04 fkex | $C_2 \gg C_1$ |
| EXAMPLE FOR COMPARISON 3 | 0.02 fkex | |
| PRESENT INVENTION AVALANCHE REGION (QUANTUM EFFICIENCY 10) | 0.30 fkex | $\varepsilon_0 = 0.15$ $\varepsilon_1 = 0.5$ |
| PRESENT INVENTION PLATEAU REGION (QUANTUM EFFICIENCY 1.0) | 0.03 fkex | $h\nu_0 = 2.5eV$ |

PHOTO-SENSOR AND METHOD FOR OPERATING THE SAME

This application is a continuation of application Ser. No. 415,301, filed on Aug. 21, 1989 now abandoned.

TECHNICAL FIELD

The present invention relates to a photo-sensor for generating an electrical signal in accordance with the quantity of an incident light and a method of operating the photo-sensor and, more particularly, to a photo-sensor suitable when used as the imaging element of an imaging device or the like and a method of operating the photo-sensor. This photo-sensor includes a variety of image pickup or electrophotographic devices and a medical X-ray imaging device.

Incidentally, the "light" will be herein termed as an electromagnetic wave for generating electron-hole pairs acting as photo-carriers when it is incident upon a photoconductor.

BACKGROUND ART

A photo-sensor, i.e., a storage type photo-sensor having functions to store and read out an electric signal according to the quantity of an incident light is advantageous over a non-storage type photo-sensor in that it can produce a more intense signal to attain a higher S/N ratio because it stores an electric signal generated by an incident light during its storage time. Storage type photo-sensors and signal reading methods are known. A system for reading signals by scanning an electron beam a photoconductive type image pickup tube (the operating principle of which is disclosed in Japanese Patent Laid-Open No. 58-194231) has been disclosed in the prior art, as have a system for reading out signals through a switching element disposed at each picture element and its wiring a solid-state image sensor (as referred to pp. 123 to 134 of "Imaging Technology" published by Corona Corp.) and a system for reading out signals by irradiations with a reading light for reading out the signals (as referred to pp. 81 to 87 of SPIE, Vol. 173 (1979)).

In the prior art, on the other hand, electrophotography using a photoconductive material has a wide variety of uses including in a facsimile machine and in a copying machine. In the medical field, moreover, electrophotography called Zeroradiography is used for dental or breast inspections. In this medical field, the digitization of an image has recently advanced as far as the desire to develop a system capable of not forming an analog image using toner like the aforementioned Zeroradiography but reading out the image in the form of electric signals and digitizing the signals. The papers having proposed a system of that kind are exemplified by Japanese Patent Laid-Open No. 59-99300, U.S. Pat. No. 4,268,750 and pp. 176 to 184 of SPIE, Vol. 626 (1986).

These photo-sensors adopt various signal reading methods and the structures therefor. One example of the conventional device using no signal reading light will be described below.

With reference to FIG. 17, an X-ray imaging device will be described as an example of the photo-sensor using a storage type photoconductive layer. FIG. 17 is a diagram showing a fundamental structure for explaining the operating principle of the photo-sensor. In this photoconductive device, charges are stored by a corona discharge in the surface region of a photoconductor 1701 formed over a substrate 1702, and the photoconductor 1701 is then irradiated with an X-ray. As a result, electron-hole pairs are generated by the interaction between the X-ray and the photoconductor 1701 and are moved by the internal electric field of the photoconductor 1701 to neutralize the charges which are stored in advance in the surface of the photoconductor 1701. At this time, a charge pattern according to the intensity distribution of the incident X-ray is formed in the surface of the photoconductor 1701. Since, this charge pattern is left in the surface of the photoconductor as the residual charge, i.e., the residue of the charge neutralized by the incident X-ray, it produces an X-ray image when it is read out by an electrometer 1703. This electrometer 1703 is equipped with a plurality of probes, which can scan the vicinity of the surface of the photoconductor 1701 to detect the potential pattern. The residual charge Q is expressed by the following equation if the charge stored by the corona discharge is designated at $Q_O$ and if that component of the charge generated by the X-ray irradiation, which has reached the surface of the photoconductor 1701, is designated at $Q_S$:

$$Q = Q_O - Q_S \ldots \quad (1).$$

Here, the component $Q_S$ is less than the generated charge because of the recombination of the electrons and holes in the photoconductor 1701. Considering this recombination effect, a carrier generation efficiency n is introduced, as will be defined by the following equation (2):

$$= d\xi/dn \, E \cdots \quad (2).$$

This efficiency is known to take a substantially constant value. Here, the term $d\xi/dn$ is defined as an energy necessary for generating one charge in the surface of the photoconductor 1701, and the letter E designates the electric field in the photoconductor 1701. Those values $\xi$, n and E are given by the following equations:

$$\xi = f \, k \, X \, A$$

$$n = Q \, s \, A/e, \text{ and}$$

$$E = Q \, s/C \, d \cdots \quad (3).$$

Here: letter f designates the energy absorption efficiency for the radiation of the photoconductor; letters k and X designate the energy flux per unit exposure of the incident radiation and the exposure itself, respectively; letters A, d and C designate the area, the layer thickness and the electrostatic capacity per unit area of the photoconductor, respectively; and letter e designates an elementary electric charge.

From these, the relation between the signal charge and the exposure is obtained by the following equation:

$$Q_S = Q_0 \left[ 1 - e^{\frac{fkl}{ndC} \cdot x} \right]. \quad (4)$$

Incidentally, this equation is simplified in a low exposure region, as following:

$$Q_S = \frac{1}{n/E_0} f k e X. \quad (5)$$

and $$E_0 = \frac{Q_0}{Cd}. \quad (6)$$

Here, letter $E_O$ designates an electric field to be applied to the photoconductor before the irradiation with the X-rays.

Like this example, the device for directly reading out the pattern of the signal (or charge), which is stored in the photoconductor, as a potential variation with the electrometer has its potential reading electrode and its scanning structure complicated and enlarged. Of the photo-sensors, moreover, the conventional sensor for scanning with an electron beam like the image pickup tube is required to have a casing structure to be evacuated. In the solid-state imaging element of the prior art on the other hand, a switching element for reading out signals has to be disposed in each picture element and arranged in a high density.

On the contrary, the photo-sensor of the type for optically reading out the stored charges is effective for solving the above-specified various problems. The conventional structure of the optical reading type photo-sensor and the operating method thereof will be described below in connection with its fundamental principle.

FIGS. 3A and 3B are diagrams showing one example of the fundamental structure of the optically reading type photo-sensor of the prior art and explaining the operations thereof, respectively. Reference numerals 301 and 304 designated transparent electrodes; numeral 302 a photoconductor; and numeral 303 an insulator. FIG. 3B illustrates the electric potential distribution in the photo-sensor at the individual steps of the operation to be described in the following. The abscissa designates the distance x normal to the light receiving plane, and the ordinate designates the electric potential V. First of all, a DC source 305 having a voltage $V_1$ is connected between the transparent electrodes 301 and 304. If the photoconductor 302 and the insulator 303 have electrostatic capacities $C_1$ and $C_2$, the potential distribution in the photo-sensor takes a form, as indicated at 310 in FIG. 3B. If, in this state, the photoconductor 302 is optically irradiated, the generated electrons are stored in the interface 315 with the insulator 303 so that the potential distribution reaches an equilibrium, as indicated at 311. Next, a switch 306 is turned to connect the photo-sensor with a DC source 307 having the opposite polarity of the DC source 305. At this time, the potential distribution is indicated at 312 to establish again the electric field in the photoconductor 302. This is the ready state of the example of the prior art. If, in this state, a light 320 to be observed (which will be called the "signal light") comes from the outside, the resultant holes are moved to the interface 315 between the photoconductor 302 and the insulator 303 by the internal electric field of the photoconductor 302 generated by the DC source 307 until they are recombined with the electrons stored in advance in that interface 315. As a result, the potential distribution takes a form, as indicated at 313. If the quantity of charge generated by the signal light 320 is designated at $Q_S$, the potential at the aforementioned interface 315 varies by $Q_S/(C_1+C_2)$. After the signal light 320 has been shaded, the switch 306 is turned again to connect the transparent electrode 301 with the DC source 305. As a result, the potential distribution takes a form, as indicated at 314. If a reading light 321 for signal reading is then caused to irradiate the photoconductor 302, the potential distribution restores the equilibrium 311. In this meanwhile, the charges $C_2Q_S/(C_1+C_2)$ proportional to the signal charges $Q_S$ generated by the signal light 320 flow through a load 308 and are detected at an output terminal 309. Incidentally, in case the polarities of the DC sources 305 and 307 are opposite to the aforementioned ones of FIGS. 3A and 3B, the polarities of the charges to be stored and recombined and the potentials are inverted, the operations are similar on principle so that their detailed description will be omitted.

FIGS. 4A and 4B are diagrams showing a structure based on another principle according to the prior art and the potential distributions in four states of the operations, respectively. In FIG. 4B, the abscissa designates the distance x normal to the light receiving plane, and the ordinate designates the potential V. This photo-sensor is constructed of a lamination of a transparent electrode 401, a photoconductor 402, a charge storage layer 415, a photoconductor 403 and a transparent electrode 404. The following description is directed to the operational principle in case the charge storage layer 415 has a function to store electrons. A DC source 405 is connected with the electrode 401 to apply a negative voltage of $-V_1$ to the laminated structure (between the electrodes 401 and 405). The potential distribution in this state takes a form, as indicated at 410 in FIG. 4B, if the electrostatic capacities of the photoconductors 402 and 403 are designated at $C_1$ and $C_2$. If a signal light 420 is then incident upon the photoconductor 402, the electron-hole pairs are established in the photoconductor 402 so that the electrons migrate toward the charge storage layer 415 until they are stored therein, as indicated at a potential distribution 411. If, at this time, the quantity of charges generated by the signal light 420 is $Q_S$, the potential of the charge storage layer 415 drops by $Q_S/(C_1+C_2)$. If the switch 406 is turned to drop the potential of the transparent electrode 401 to zero after the signal light 420 has been shaded, the potential distribution takes a form, as indicated at 412. If the photoconductor 403 is then irradiated with a reading light 421 for signal reading, the electron-hole pairs are generated so that the holes migrate to the charge storage layer 415 to neutralize the electrons previously stored, until an equilibrium is reached, as indicated at a potential distribution 413. Meanwhile, the quantity of charge $C_1Q_S/(C_1+C_2)$ proportional to the signal charge $Q_S$ flows through a load 408 so that it is detected as a voltage signal from an output terminal 409.

Disclosure Of The Invention

As has been described hereinbefore, the optical signal reading of the storage type photo-sensor is advantageous for simplifying the structure of the sensor and facilitating the signal reading. Despite these advantages, however, the optical reading type photo-sensor of the prior art has problems to be solved.

The first problem is the preparation for observing the signal light. In the aforementioned optical reading type photo-sensor, the preparation for receiving the signal light (as indicated at the potential distributions 312 and 410 in FIGS. 3B and 4B, respectively) is the state, in which the electric field is applied to the photoconductors 302 and 403, but not the equilibrium for the irradiation with the reading light. Therefore, if the irradiation with the reading light is accomplished after the storage of the signal charge without any variation in the applied voltage, a further movement of charges occurs to generate spurious signals even after the movement of the charges proportional to the quantity of stored signals has occurred to return the potential distribution to the preparatory state. In order to avoid the generation of spurious signals, it is necessary to effect the switching operations for switching the power source between the reception of the signal light and the reading out of the signal and to provide the switch 306 or 406 for the switching operations so that the signals cannot be stored in response to the signal light to be subsequently observed, instantly from the state (as indicated at the potential distributions 311 and 413 in FIGS. 3B and 4B) after the reading of the signals. The prior art thus far described still complicates the structure and operations of the device because it requires such switching operations. In the photo-sensor thus far described according to the prior art, more specifically, preparations are again required for obtaining the information of the signal after a first reading of the stored charges. Thus, the preparations are necessary each time a reading operation is to be conducted so that a number of images cannot be obtained at a high speed. This problem is shared commonly among the preparations called the "corona discharge" for operating a photo-sensor that is not of the optical reading type of the prior art, as has been described with the reference to FIG. 17 and is still unsolved in the photo-sensors of the optical reading type shown in FIGS. 3A and 3B and FIGS. 4A and 4B. Specifically, the problem is the voltage switching after the signal reading and before the signal storage in response to the incident light, that is to say, the voltage switching after the signal storage in response to the incident light and before the irradiation with the reading light of the stored signal. It is desirable to make the preparations unnecessary at each time so that successive images may be formed. If this desire is satisfied, moreover, it is possible to accomplish successive reading which has been impossible in the optical reading type photo-sensors of the prior art.

This successive reading is a photographic method for monitoring the motions of an object in real time by successive irradiations with a signal light. According to this operation, the image of an incident light is successively converted into electric signals by successively shifting the timings at which the signals are stored and read out, for each picture element with a single element such as an image pickup tube. The X-ray imaging device or the like of the prior art cannot successively shift the storing and reading timings of the X-ray information to convert the image of the incident X-ray successively into the electric signals. In order to make this conversion possible, it is necessary to perform irradiations with a pulse X-ray, for example.

The second problem is the sensitivity or S/N ratio of the photo-sensor. All of the photo-sensors of the prior art are required to undergo preparation before the incidence of the signal light, as has been described hereinbefore. At the end of the preparations, moreover, the electric field (as indicated at 312 in FIG. 3B and at 410 in FIG. 4B) exists in the insulator or second photoconductor (as indicated at 303 in FIG. 3A and 404 in FIG. 4A) of the lamination constructing the photo-sensor. This means that the voltage supplied from an external source is partially applied to the insulator layer and second photoconductors. Because of the voltage loss in the photo-sensor of the prior art, the potential difference is not effectively used even if it is applied between the two electrodes of the photo-sensor. This results in a reduction of the sensitivity or S/N ratio of the photo-sensor. In order to explain this quantitatively, the operations of those photo-sensors will be quantitatively considered once more.

In the photo-sensor of FIGS. 3A and 3B, the voltage $V_1$ is first applied between the electrodes 301 and 304 of FIG. 3A. Here, the potential distribution in the detector when the voltage of $-V_1$ is applied is indicated at 310 in FIG. 3B. Since the letters $C_1$ and $C_2$ appearing in FIG. 3B designate the electrostatic capacities of the photoconductor 302 and the insulator 303, respectively, the potential at the interface 315 between the photoconductor 302 and the insulator 303 is expressed by $-C_1V_1/(C_1+C_2)$ when the voltage of $-V_1$ is applied.

If, in this state, the photoconductor 302 is irradiated with a light, the generated electrons are stored in the interface 315 with the insulator 303 so that the potential thereof drops until an equilibrium is established, as indicated at the potential distribution 311 in FIG. 3B. If the switch 306 is turned to apply the voltage $V_2$ having the opposite polarity of that of the foregoing step to the detector, the potential distribution takes the form as indicated at 312 in FIG. 3B. Because of the application of the voltage $V_2$ having the opposite polarity, more specifically, the electrons stored in the interface 315 have their potential raised from $-V_1$ to $-(C_2V_1-C_1V_2)/(C_1+C_2)$, and the face contacting with the electrode 301 has its potential raised to $+V$ so that the potential inbetween has a gradient. At this stage, the preparations for the information recording have been ended.

If, in this state, the signal light 320 coming from the outside is incident upon the photoconductor 302, electron-hole pairs are generated. These holes are moved to the interface 315 with the insulator 303 by the electric field until they are recombined with the electrons previously stored. As a result, the potential distribution takes the form, as indicated at 313 in FIG. 3B. In other words, the potential at the interface 315 rises from the value of $-(C_2V_1-C_1V_2)/(C_1+C_2)$ to a higher level, as indicated by the arrow, because the electrons are reduced as a result of recombination with the holes. If the quantity of charges established by the incident X-ray is designated at $Q_S$, the potential at he aforementioned interface varies by $Q_S/(C_1+C_2)$. After the signal light 320 is shaded, the switch 306 is turned again to connect the transparent electrode 301 with the DC source 305. As a result, the potential difference takes the form, as indicated at 314. If the photoconductor 302 is then irradiated with the signal reading light, the distribution takes the form, as indicated at 311 in FIG. 3B, so that the charges proportional to the value $Q_S$ flow through the load 308 to read out the signal.

In this photo-sensor, however, the voltage is partially applied to the insulator 303 in the state immediately before the incidence of the signal light, i.e., at the end of preparation so that the voltage component of $(V_1+V_2)C_1/(C_1+C_2)$ of the voltage of $(V_1+V_2)$ does not contribute to the information recording. The voltage loss invites the drop of the S/N ratio.

In the photo-sensor of FIGS. 4A and 4B, on the other hand, the voltage of $-V_1$ is first applied between the electrodes 401 and 404. The potential distribution at this time takes the form, as indicated at 410 in FIG. 4B, so that the potential at the charge storage layer 415 takes the value of $-C_1V_1/(C_1+C_2)$. Thus, the recording preparations are completed.

Next, the interactions are caused by irradiating the photoconductor 402 with the signal light 420 to generate the electron-hole pairs. These electrons run to the charge storage layer 415 and are stored therein so that the potential distribution takes the form, as indicated at 411 in FIG. 4B. In other words, the potential of $-C_1V_1/(C_1+C_2)$ is dropped as a result of the increase in the electrons to a level slightly higher than the potential of $-V_1$. Here, if the stored charges are designated as $Q_S$, the potential drops by $Q_S/(C_1+C_2)$. Incidentally, the letters $C_1$ and $C_2$ designate the electrostatic capacities of the photoconductors 402 and 403, respectively.

Next, if the switch 406 is turned to read out the stored charges $Q_S$, the potential at the electrode 406 rises from $-V_1$ to 0 so that the potential distribution takes the form, as indicated at 412 in FIG. 4B. In other words, the potential at the charge storage layer 415 rises by $C_1V_1/(C_1+C_2)$ to $Q_S/(C_1+C_2)$.

If, in this state, the second photoconductor 403 is irradiated with the signal reading light 421, the electron-hole pairs are generated so that the holes migrate toward the charge storage layer 415 until they are recombined with the previously stored electrons. At last, the potential distribution reaches an equilibrium, as indicated at 413 in FIG. 4B. At this time, the current flows through the load 408 to produce the signal.

In this method, too, the voltage is partially applied to the second photoconductor 403 in the state immediately before the incidence of the signal light, i.e., the end of the preparation so that the voltage component of $C_1V_1/(C_1+C_2)$ of the voltage $V_1$ does not contribute to the information recording. Thus, this voltage loss component invites the drop of the S/N ratio.

In order to solve the above-specified problems, we have disclosed a photo-sensor having the following characteristics and the method of operating the same, while finding out that it is important, for realizing a high S/N ratio in the photo-sensor for reading out signals in response to irradiation with a light, that when the signal is to be read out, the element (i.e., the second photoconductor) reaches an equilibrium, in which charges more than necessary do not migrate, for the irradiation with the reading light after the migration of the charges is a quantity according to the quantity of the stored signals have taken place.

In accordance with one aspect of the present invention, there is provided a photo-sensor which comprises: a first photoconductor for photoelectrically converting a signal light; a second photoconductor for photoelectrically converting a signal reading light; an intermediate region arranged between said first photoconductor and said second photoconductor; means for applying electric fields to said two photoconductors; and an optical source for irradiating said second photoconductor with said signal reading light to make the potential distribution inside of said second photoconductor substantially uniform. This photo-sensor further comprises transparent electrodes for applying electric fields and said signal light or said signal reading light to said two photoconductors. When in the signal reading operation, the second photoconductor is irradiated with the light to have a constant internal potential so that the signal reading end state can be used as the preparation end state to avoid the need for any special preparations and to improve the S/N ratio.

In accordance with a further aspect of the present invention, moreover, there is provided a photo-sensor in which the first photoconductor multiplies the photo-carriers produced therein. This multiplication of the photo-carriers in the first photoconductor realizes improvements in the sensitivity and the S/N ratio.

In accordance with a further aspect of the present invention, there is disclosed a photo-sensor in which the first photoconductor has an amorphous semi-conductor layer and in which the multiplication of the aforementioned photo-carriers is accomplished by the avalanche multiplication of the amorphous semiconductor layer. This photo-sensor comprises means for applying the electric field for establishing the avalanche multiplication in the amorphous semiconductor layer. This electric field applying means may be exemplified by the aforementioned means for applying the electric fields to the two photoconductors. This electric field applying means applies an electric field having such an intensity as can establish the avalanche multiplication in the aforementioned amorphous semiconductor layer. The photo-sensor of the present invention has two blocking structures for preventing carrier injection, so that the carriers may not be injected from the outside into the two photoconductors even under that electric field. These two carrier injection blocking structures are provided for the first and second photoconductors, respectively. As a result, the signal is multiplied, and a dark current is maintained at a low level.

In accordance with another aspect of the present invention, there is provided a method of operating the optical reading type photo-sensor, in which the signal light is read out by photoelectrically converting the signal light by a first photoconductor and by photoelectrically converting a stored charge pattern by a second photoconductor, whereby the preparations for the photoelectric conversion of the signal light are completed at the end of the signal reading. In this photo-sensor operating method, the step of photoelectrically converting the signal light and the step of reading the signal are accomplished in the state in which electric fields are applied to the two photoconductors. The signal reading step is completed in the state with the electric field in the second photoconductor being substantially uniform so that the aforementioned preparations can be completed to improve the S/N ratio of the photo-sensor.

In accordance with another aspect of the present invention, there is provided a method of operating the photo-sensor in which the photo-carriers generated by photoelectrically converting the signal light are multiplied in the first photoconductor. This first photoconductor includes an amorphous semiconductor layer for the multiplications, and an electric field for the avalanche multiplications is applied to the inside of the amorphous semiconductor layer. Thus, it is possible to realize the method of operating the photo-sensor with better improved sensitivity and S/N ratio.

In accordance with another aspect of the present invention, there is provided a photo-sensor which comprises: a first electrode; a first photoconductor for photoelectrically converting a signal light to generate photo-carriers; a second photoconductor for photoelectrically converting a signal reading light to generate photo-carriers; a second electrode; a first injection blocking structure for blocking the injection of carriers of at least one polarity from said first electrode to said first photoconductor; a second injection blocking structure for blocking the injection of carriers of at least one polarity from said second electrode to said second photoconductor; and an optical source for emanating said signal reading light, wherein an intermediate region for storing and recombining the carriers is arranged between said first photoconductor and said second photoconductor, and wherein said first photoconductor and said second photoconductor are interposed between said first electrode and said second electrode. This photo-sensor further comprises electric field applying means for applying electric fields to the first and second photoconductors. The optical source substantially uniformalizes the electric field in the second photoconductor the signal reading light into the second photoconductor. According to these characteristics, it is possible to realize a photo-sensor which does not require any special preparations for the incidence of the signal light but can improve the S/N ratio. The aforementioned intermediate region can take a variety of structures because it may effect the storage and recombinations of the carriers. The structure to be used may be a rectifying structure formed by a hetero junction, which is formed in the interface between the first and second photoconductors by their contact. Apart from this junction structure, moreover, a layer for storing and recombining the carriers may be disposed as the intermediate layer. This intermediate layer may be exemplified by a layer having a larger energy band gap than those of the first and second photoconductors - an insulating layer or a variety of crystal or amorphous semiconductor layers.

In accordance with another aspect of the present invention, there is provided a photo-sensor in which the first photoconductor has an amorphous semiconductor layer for carrier multiplications. This amorphous semiconductor layer realizes a remarkable improvement in sensitivity. A preferable amorphous semiconductor layer is made of an a-Se layer. The aforementioned electric field applying means applies an electric field having such an intensity as can establish avalanche multiplications in the a-Se layer. In this case, the aforementioned two blocking structures have to sufficiently exhibit their functions. The drop of these functions would cause an increase in the dark current.

In accordance with another aspect of the present invention, there is provided a photo-sensor in which a phosphor for generating a light (e.g., a visible radiation) having a relatively low energy in response to a signal light exemplified by a radiation having a high energy such as the X-ray is disposed in the vicinity of the aforementioned first electrode.

In accordance with another aspect of the present invention, there is provided a photo-sensor which comprises means for scanning, a reading light emitted from the aforementioned optical source. This scanning may be either electric or optical. The optical source can be exemplified by a semiconductor laser. In the optical scanning case, the signal reading light may be exemplified by either a non-divergent beam for two-dimensional scanning or a beam diverging in the form of a sector for one-dimensional scanning. In the latter case of the divergent beam, it is preferable to use a second electrode which is divided into a plurality of sections elongated to cross the diverging direction. This divided electrode can reduce the capacity. Thus, the signal can be read out simultaneously in parallel so that the time for this signal reading can be shortened. In the case of the electric scanning, on the other hand, the second electrode is divided into a plurality of arrayed sections, and a plurality of optical sources are disposed to correspond to the divided electrode sections. Then, there can be used for electrically and successively turning on and off those plural optical sources. This switching means is composed of: a selector for selecting an arbitrary one of the arrayed optical sources; and a scan control circuit. Each optical source corresponds to one picture element.

In accordance with another aspect of the present invention, there is provided a photo-sensor which comprises: a first electrode; a second electrode; a first photoconductor arranged between said first electrode and said second electrode and in the vicinity of said first electrode for receiving a signal light; a second photoconductor arranged between said first and second electrodes and in the vicinity of said second electrode for receiving a signal receiving light; an intermediate region arranged between said first photoconductor and said second photoconductor for storing and recombining carriers; electric field applying means for applying electric fields to said first and second photoconductors; and an optical source for generating said signal reading light, wherein said electric field applying means applies such an electric field that the potential of said first electrode may take with respect to said second electrode an opposite polarity of that of the first carriers stored in advance in said intermediate region so that the second carriers generated in said first photoconductor by said signal light may neutralize at least a portion of said first carriers whereby the change in said first carriers is compensated by the second carriers generated in said second photoconductor by the reading light coming from said optical source to establish an equilibrium.

Thus, according to the present invention, the operations of the photo-sensors can be speeded up because no special preparations for the incidence of the signal light are required in the optical reading type photo-sensor and its operating method. This speed-up raises an advantage in that a successive reading can be accomplished for each picture element.

Since, moreover, the necessity for the aforementioned preparations is eliminated, another advantage obtainable is the realization of a photo-sensor of high S/N ratio and its operating method.

Still, a further advantage of the present invention will become apparent to those of ordinary skill in the art upon reading and understanding the following best mode for carrying out the invention.

BRIEF DESCRIPTION OF THE DRAWINGS

The invention may be taken from various parts and arrangements of parts or various steps and arrangements of steps. The drawings are only for purposes of illustrating the preferred modes and are not to be construed as limiting the invention.

FIGS. 2D and 2B clearly illustrate those characteristics.

DETAILED DESCRIPTION

Figure 1:
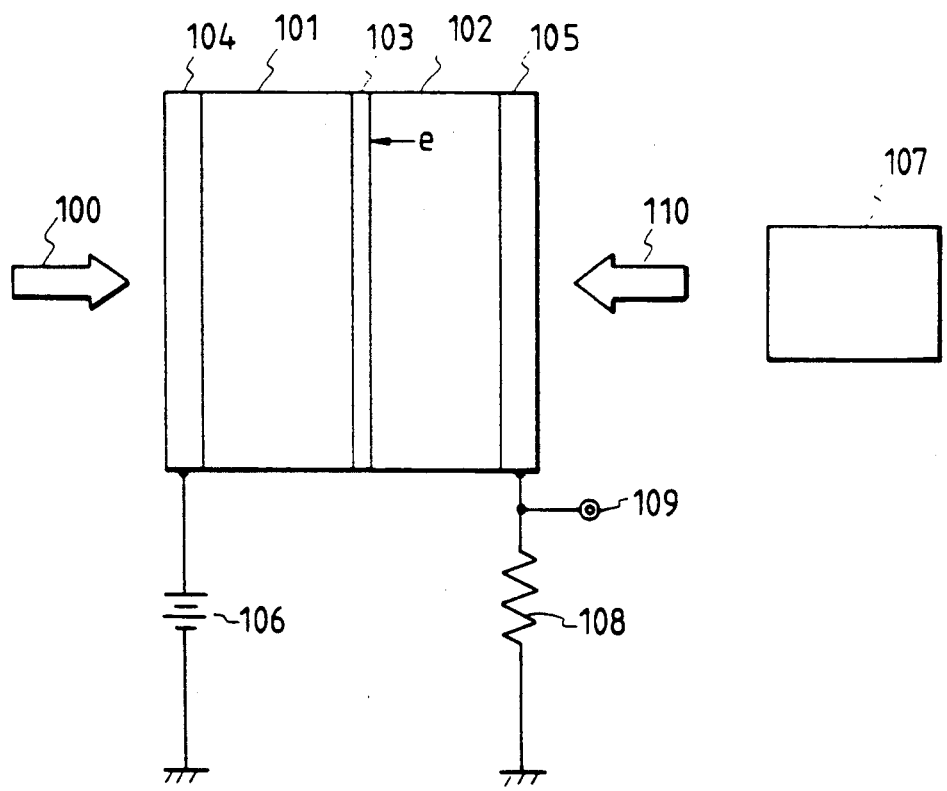
FIG. 1 is a diagram showing the fundamental structure of a photo-sensor according to the present invention.

With reference to FIG. 1, the photo-sensor according to the present invention and its operating method will be described in detail below. FIG. 1 is a diagram showing an example of the fundamental structure of the photo-sensor according to the present invention. In FIG. 1, reference numeral 101 designates a first photoconductor for generating electron-hole pairs in response to a signal light 100, and numeral 102 designates a second photoconductor for generating electron-hole pairs in response to a signal reading light 110 emitted from an optical source 107. Numeral 104 designates a first electrode having a high transparency to the signal light 100 and a structure for blocking the injection of carriers (i.e., holes or electrons) into the first photoconductor 101. Numeral 105 designates a second electrode having a high transparency to the reading light 110 emitted from the optical source 107 and also having a structure for blocking the injection of carriers (i.e., holes or electrons) into the second photoconductor 102. Numeral 103 designates an intermediate region having at least a function to store and recombine carriers. The electric field to be applied to the present photo-sensor is directed such that the carriers to be stored in the intermediate portion 103 are caused to migrate from the second photoconductor 102 to the intermediate region 103 by the action of that electric field. The direction of the electric field to be applied may be any, and the description to be made in the following is directed to the photo-sensor having a structure in which the carriers to be stored in the intermediate region 103 are electrons. In this case, the electric field is applied in such a direction that the potential of the first electrode 104 is positive with respect to the second electrode 105. As a result, the electrons generated by the second photoconductor 102 migrate toward the intermediate region 103 until they are stored therein. The intermediate region 103 can be formed of either a potential barrier formed in the junction between the two photoconductors 101 and 102 or an electron capture layer formed between the two photoconductors. In this case, the electrons are not injected from the photoconductor 102 into the photoconductor 101 but are stored in the intermediate region 103. Each of the first photoconductor 101 and the second photoconductor 102 may have a laminated structure of a plurality of semiconductor layers. On the other hand, a blocking layer for blocking the injection of the carriers of opposite polarities to be determined by the direction of applying the electric field may be formed either between the electrode 104 and the first photoconductor 101 or between the electrode 105 and the second photoconductor 102. The fundamental structure of this photo-sensor is completed by disposing electric field applying means 106 for applying electric fields to the insides of those photoconductors and a load 108 in a circuit system for operating the present photo-sensor and by disposing a signal output terminal 109 midway of that circuit system. One of the important characteristics of the photo-sensor according to the present invention resides in the function of the optical source 107, as will be clarified below.

Figure 2A:
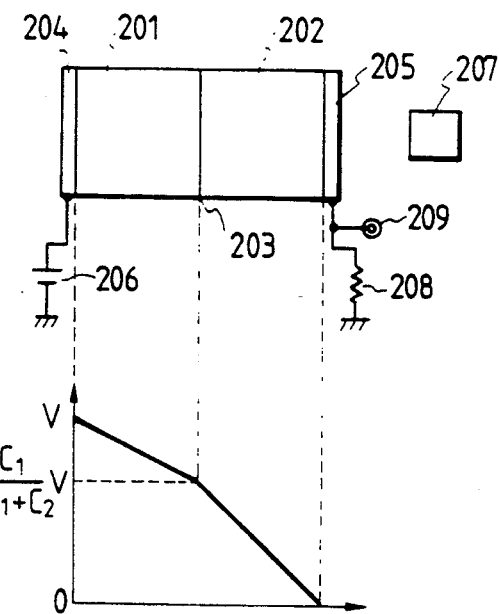
FIGS. 2A, 2B, 2C and 2D are diagrams for explaining the method of operating the photo-sensor according to the present invention and illustrate the fundamental structures of the photo-sensor according to the present invention and the intensities of electric fields applied to the inside at the individual steps. The important characteristics reside in the electric field in the second photoconductor at the end of the reading.

The principle of the operating method of the photo-sensor having the structure shown in FIG. 1 will be described in detail with reference to FIGS. 2A, 2B, 2C and 2D. These figures illustrate the potential distributions in the representative four states of the present sensor. In the graphs appearing in the lower portions of the figures, the distance normal to the optical receiving plane is plotted on the abscissa, and the potential is plotted on the ordinate. FIG. 2A illustrates the state in which a voltage is applied to the present sensor in the dark. Here, if it is assumed that a first photoconductor 201 has a capacity $C_1$ whereas a second photoconductor 202 has a capacity $C_2$ and that the applied voltage is V, the potential at an intermediate region 203 between the two photoconductors is expressed by $C_1V/(C_1+C_2)$ If, in this state, the second photoconductor 202 is irradiated with a light 210, electron-hole pairs (i.e., photocarriers) are formed in the second photoconductor 202 so that the holes flow into a second electrode 205 in accordance with the direction of an electric field given by electric field applying means 206. On the other hand, the electrons migrate toward the intermediate region 203 until they do not flow into the first photoconductor but are stored in the intermediate region 203. As a result, the potential at the intermediate region 203 varies, as indicated by arrow in the graph of FIG. 2B, until it takes a distribution, as indicated by solid curve so that an equilibrium is established while applying no voltage to the second photoconductor 202. At this time, the intermediate region 203 stores the charges of $-C_1V$. As a result, the present sensor has its initialization ended and is brought into a prepared state. If, in this prepared state, the first photoconductor 201 is irradiated with the signal light 200, the electrons of electron-hole pairs (i.e., the photocarriers) generated in the first photoconductor 201 flow into a first electrode 204 in accordance with the direction of the electric field applied to the two photoconductors by the electric field applying means 206. On the other hand, the holes migrate toward the intermediate region 203, in which they are recombined with the previously stored electrons. As a result, the potential distribution changes, as indicated by arrow in the graph of FIG. 2C. If, at this time, the charges generated by the signal light are designated as $Q_S$, the quantity of the charges stored in the intermediate region 203 is expressed by $Q_S - C_1 V$ so that a voltage of $Q_S/(C_1 + C_2)$ is applied to the second photoconductor 202. If this second photoconductor is then irradiated again with the reading light 210 coming from an optical source 207, the electrons of the photo-carriers generated by the optical irradiation migrate toward the intermediate region 203 and are stored therein so that the potential distribution changes, as indicated by arrow in the graph of FIG. 2D, until the sensor is restored to its prepared state. In this process, a charge of $C_1/(C_1 + C_2) Q_S$ flows in a load 208 so that a signal voltage is detected at an output terminal 209. In this reading procedure, the sensor is automatically restored to its prepared state. Thus, if the irradiation with the reading light 210 is ended after the signal reading, a subsequent signal light 200 can be received to restart the storage of the signal charge. This constitutes an important feature of the present invention. Hence, the optical source 207 has to sequentially irradiate the second photoconductor 202 with a signal reading light 210 sufficient for making the internal electric field of the second photoconductor 202 substantially flat (or uniform).

In the operating method of the photo-sensor of the prior art having been described with reference to FIGS. 4A and 4B, there is applied a voltage to give the same potential to the first electrode with respect to that of the second electrode as that of the carriers stored between the two photoconductors, and the carriers generated by the signal light are stored and neutralized by the carriers generated by the reading light. In the photo-sensor according to the present invention, on the contrary, the carriers stored in advance and having the opposite polarity are neutralized by the carriers which are generated by the signal light with the photo-sensor being supplied with a voltage for giving the opposite polarity of that of the stored carriers to the potential (or polarity) of the first electrode with respect to the second electrode, and the resultant variation of the stored carriers is compensated to restore the equilibrium by the carriers generated by the reading light. In this equilibrium, the second photoconductor 202 has no voltage applied, that is, in the preparation ended state (with the potential distribution indicated by the solid curve in the graph of FIG. 2D) so that a signal light 200 to be subsequently observed can be received.

Figure 2C:
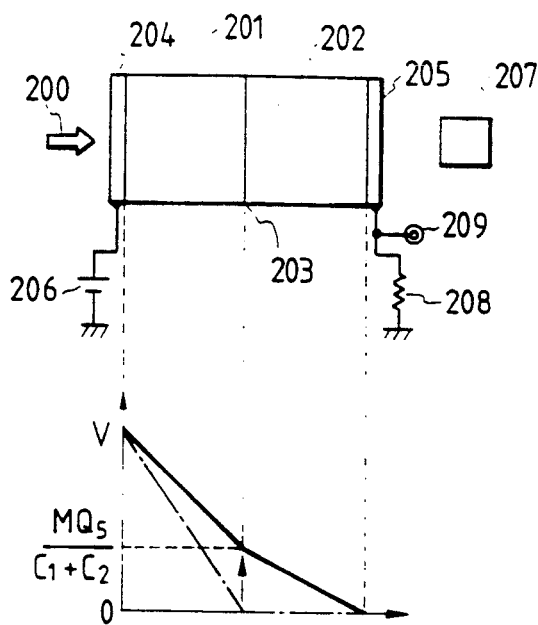
Figure 2B:
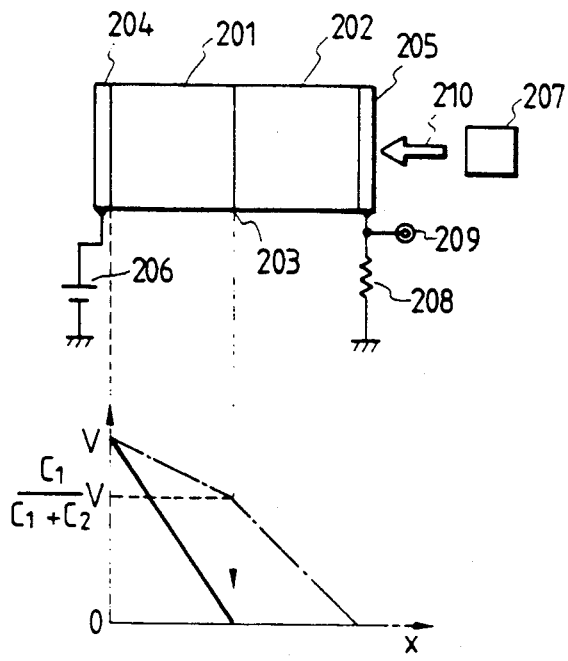
Figure 2D:
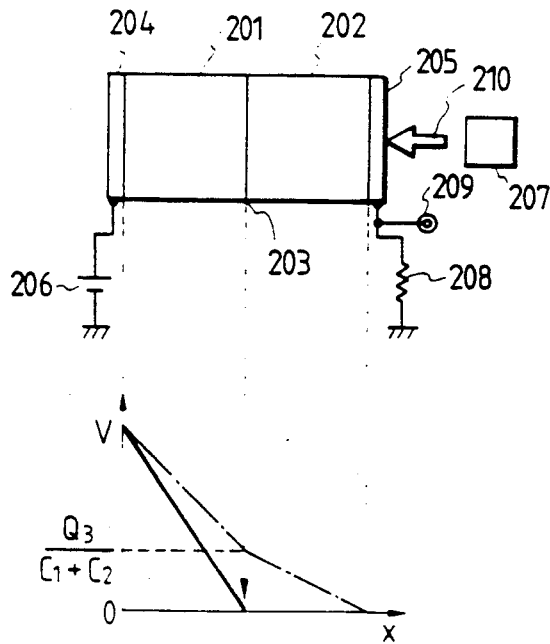
Figure 3A:
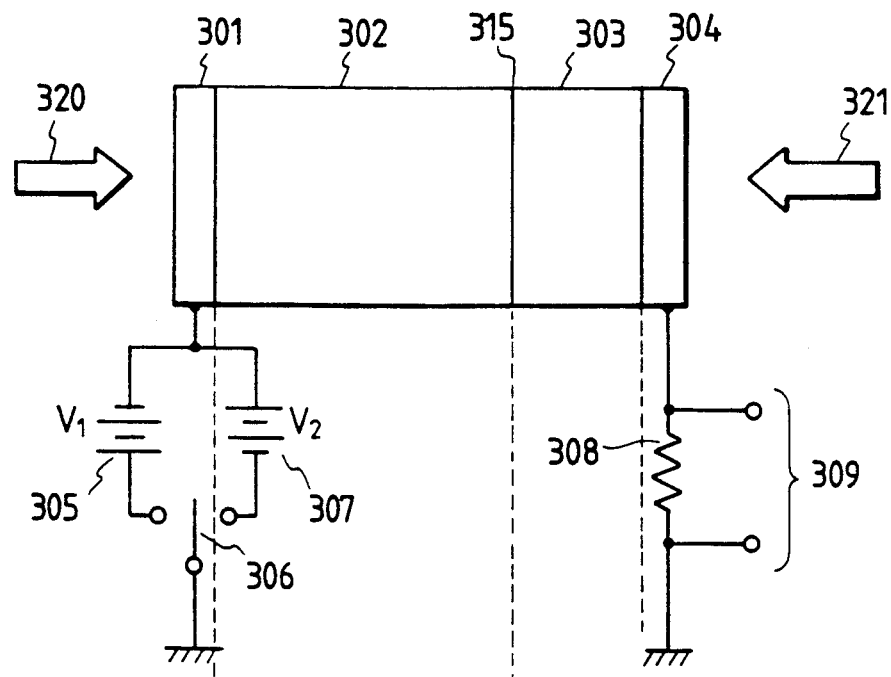
FIGS. 3A and 3B are diagrams for explaining the optical reading type photo-sensor of the prior art and its operating method.
Figure 3B:
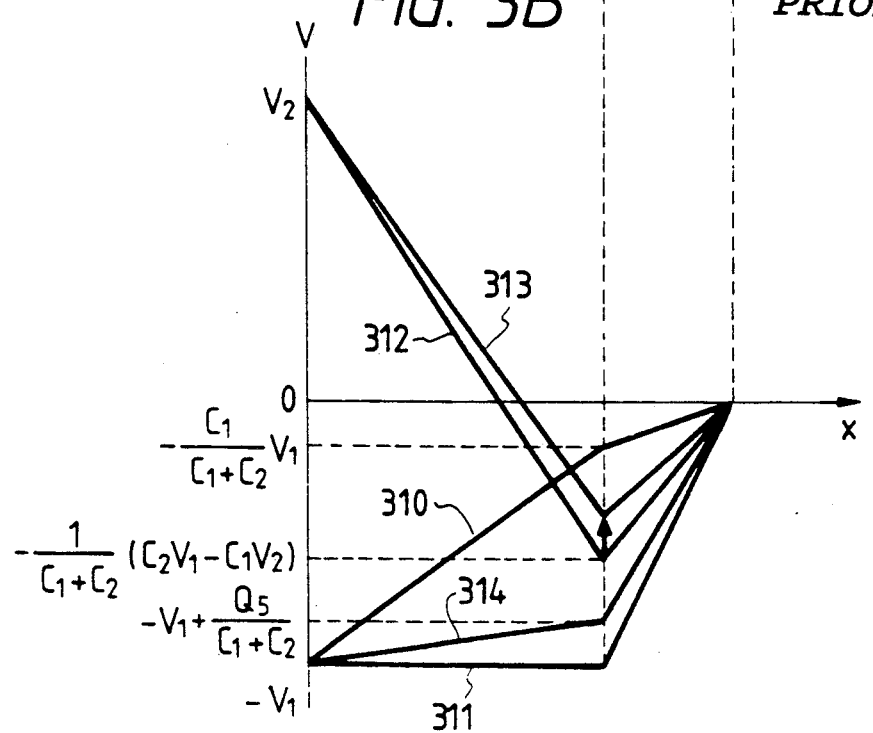
Figure 4A:
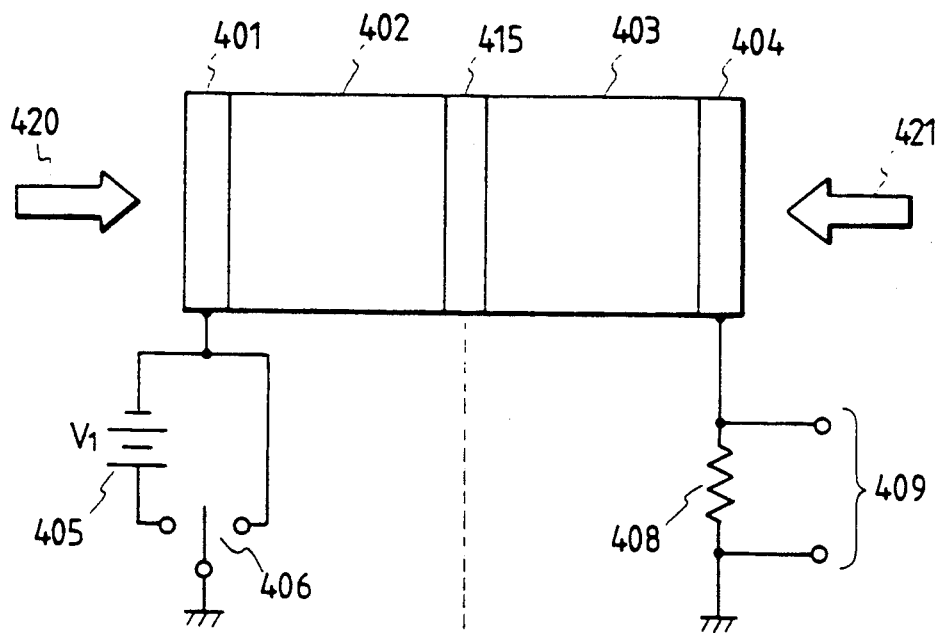
FIGS. 4A and 4B are diagrams for explaining another optical reading type photo-sensor of the prior art and its operating method.
Figure 4B:
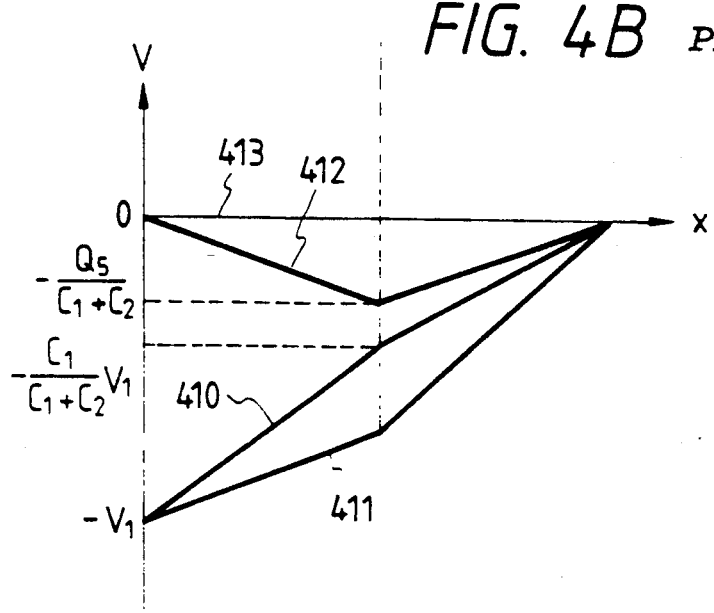

According to the photo-sensor and its operating method of the present invention, as has been described hereinbefore, the signal light can be converted into the electric signals by successively repeating the procedures of FIGS. 2C and 2D with neither electric nor mechanical switching, as shown at 306 and 406 of the examples of the prior art in FIGS. 3A and 4A. As a result, if a light focused to a necessary size of the picture element is used as the reading light and for the scanning, the distribution of the light to be observed and its change with time can be read out as electric signals varying with time so that a video image of the signal light can be observed on real time by a TV monitor, for example. For this purpose, the reading timing may be shifted for each picture element. In case, on the other hand, the intermediate region 203 for storing the carriers has such a low resistance that it cannot hold the charge pattern, it is recommendable to integrate a plurality of photo-sensors of necessary size so that the image of the signal light may be read out as a whole by the scanning with the reading light. At this time, the reading side electrodes of the individual sensors may be electrically connected into one output line. In this case, too, the signals of the picture elements scanned with the reading light are sequentially outputted to produced the electric signals varying with time. This makes it unnecessary to provide a switching element for each picture element unlike the solid-state imaging element of the prior art.

In the foregoing description of the operating principle, for initialization of the sensor, the electric source 206 is first connected, and the second photoconductor 202 is optically irradiated. On the contrary, the electric source 206 may be connected after the second photoconductor 202 has been optically irradiated. Since, in this latter case, the sensor can be prepared with no voltage application to the second photoconductor 202, the case is suitable for the case in which the second photoconductor 202 has a low breakdown voltage. In the present sensor, moreover, the prepared state and the signal stored state cannot be held if carriers having no relation to the irradiating light are injected from the electrodes into the photoconductor. Therefore, it is preferable to use such a structure as will block the injection of the carriers from the electrodes at the two sides. For this, the carrier injection blocking layer may be disposed between each photoconductor and each electrode. In this case, the carrier injection blocking layer for a photoconductor composed mainly of amorphous selenium or hydrogenated amorphous silicon can be effectively exemplified by the following layers.

The hole injection blocking layer is suitably made of: amorphous silicon carbide or nitride containing hydrogen on at least one of halogen elements; an n-type amorphous silicon carbide or nitride containing hydrogen or at least one halogen element and at least one of V-group elements such as P or As; at least one oxide of Ce, Ge, Zn, Cd, Al, Si, Nb, Ta, Cr and W; or a combination of the above-specified two or more.

The electron injection blocking layer is suitably made of: amorphous silicon carbide or nitride containing hydrogen or at least one halogen element; a p-type amorphous silicon carbide or nitride containing hydrogen or at least one of the halogen elements and at least one of the III-group elements such as B or Al; an oxide Al of Ir; chalcogenide such as $Sb_2S_3$, $As_2S_3$, $As_2Se_3$ or Se-As-Te; or a combination of the above-specified two or more.

In the present sensor, the intermediate region 203 for storing the carriers can be exemplified by a potential barrier formed when the first and second photoconductors 201 and 202 are directly laminated. In this case, the potential barrier acts as a region for blocking the migration of, storing and recombining the carriers. In case, on the other hand, the direct junction of the first photoconductor 201 and the second photoconductor 202 would be unable to block the migration of the carriers from the second photoconductor 202 into the first photoconductor 201 and store them, it is recommendable to form either a layer for forming the potential barrier or a layer having a property to capture the carriers a the intermediate region 203 between the first photoconductor 201 and the second photoconductor 202 and to use the potential barrier and the carrier capturing layer together. Incidentally, it is desirable that the holes generated in the first photoconductor 201 by the signal light 20 do not flow into the second photoconductor 202 but efficiently neutralize the stored electrons of the intermediate region 203. Therefore, in case the intermediate region 203 is exemplified by the capturing layer, it is desirable that the capturing layer has a high recombination rate of the free holes having migrated and the electrons captured. It is also recommendable to form such a potential barrier as can prevent the holes having migrated from flowing into the second photoconductor 202 so that the holes may be efficiently recombined with the stored electrons.

In case the intermediate region 203 is made of an insulator, on the other hand, both the electrons generated in the second photoconductor 202 and the holes generated in the first photoconductor 201 are blocked from any migration by the insulator 203. As a result, each time the procedures of FIGS. 2C and 2D are repeated, the quantities of charges in the two sides of the insulator 203 increase so that the voltage to be applied to the insulator 203 is raised. When a constant breakdown voltage is exceeded, the recombination of the charges is caused through the insulator 203 by tunnel current or the like. After this, even if the procedures of FIGS. 2C and 2D are repeated, the voltage to be applied to the insulator 203 is held constant. In the procedure of FIG. 2C, the signal charges $Q_S$ are generated in the first photoconductor 201. In the procedure of FIG. 2D, charges of $C_1 Q_S/(C_1+C_2)$ proportional to the signal charges $Q_S$ flow to the external circuit. Therefore, an insulator having a suitable thickness is used as the intermediate region 203, and both the first and second photoconductors are optically irradiated in the preparing procedure, after they have been supplied with the voltage, to set the voltage applied to the insulator in the vicinity of the aforementioned breakdown voltage. Then, the intermediate region 203 can operate like the case in which it is made of another stored and recombined layer. In case the intermediate region 203 is made of an insulator, the leakage of the stored charges can be remarkably reduced to give a high S/N ratio by selecting a material which has a steep breakdown and a small leakage current below the breakdown voltage.

In the present sensor, the incidence direction and wavelength of the light and the material and thickness of the photoconductors may be so suitably determined that the signal light may not produce the carriers in the photoconductor 202 and that the reading light may not produce the carriers in the first photoconductor 201. In case the first photoconductor is made of amorphous Se and the incident light has a wavelength of 550 nm, the incident light has an absorption coefficient of about $6.54 \times 10^4$ (1/cm). If, therefore, the first photoconductor has a thickness of 1 $\mu$m or more, the ratio of the incident light transmitting through the first photoconductor is about 0.1% or less. Then, if the first photoconductor has a thickness of 2 $\mu$m, the signal light incident upon the second photoconductor can be substantially eliminated. Similarly, considering the wavelength of the reading light and the material and thickness of the second photoconductor, the reading light can not be incident upon the first photoconductor. In case, on the other hand, the first and second photoconductors cannot wholly absorb the incident light and the reading light, it is recommendable to dispose a layer acting as a shading layer in the intermediate region between the first and the second photoconductors. In this case, the layer acting as the shading layer must not create trouble in the operations of the photo-sensor of the present invention. The intermediate layer for causing the storage and recombination of the carriers may partially or wholly act as the shading layer.

On the other hand, in the case where the reading light can transmit through the first photoconductor without producing any photo-carriers in the first photoconductor, it may be introduced from the side of the first photoconductor into the second photoconductor. In other words, if these conditions are satisfied, the signal light and the reading light may be incident from the common side.

In case the first and second electrodes of the present sensor are irradiated with the signal and reading lights, respectively, the major carriers migrating in the first photoconductor 201 and the second photoconductor 202 have opposite polarities. In case, therefore, the voltage is applied with the first electrode being positive, it is desirable that the first photoconductor 201 is made of a material having a large carrier range for the holes whereas the second photoconductor 202 is made of a material having a large carrier range for the electrons.

The photoconductors to be used in the present sensor may desirably be made of a material which can facilitate formation of the layers, be excellent in photoconductivity and have a low flaw generation coefficient. An amorphous semiconductor composed mainly of selenium or an amorphous semiconductor containing hydrogen and composed mainly of silicon is especially suitable for the photoconductors of the photo-sensor of the present invention.

The present sensor can have higher sensitivity for higher proton-carrier conversion efficiency of the first photoconductor 201. As a result, the present photo-sensor can have its sensitivity remarkably enhanced if it is operated under such an electric field as can establish the avalanche multiplications of the charges.

The amorphous selenium is a material having an excellent migration ability for the holes and causes charge multiplications due to the avalanche phenomenon if a high electric field of about $8 \times 10^5$ V/cm or more is applied thereto. It is therefore suitable to use a material composed mainly of amorphous selenium as the first photoconductor 201 and to apply the voltage in the direction to render the first electrode 204 positive. A highly sensitive photo-sensor can be obtained if an electric field of about $1 \times 10^6$ V/cm or more is applied to the first photoconductor 201 made of a material composed mainly of amorphous selenium.

In the signal reading operations of the present sensor, the second photoconductor 202 is changed from the state in which the voltage of $Q_S/(C_1+C_2)$ is applied thereto, to the equilibrium without applying a voltage to the second photoconductor. On the other hand, in the case where the second photoconductor may be made of a material having a high photo-current even under a low electric field, as exemplified by an amorphous semiconductor material containing hydrogen and composed mainly of silicon. Since the amorphous silicon containing hydrogen is a material having a large carrier range for the electrons, especially excellent characteristics can be obtained if the second photoconductor 202 is made of a material containing hydrogen and composed mainly of the amorphous silicon, if the first photoconductor 201 is made of a material composed mainly of amorphous selenium and if an applied voltage is in the direction to make the first electrode 204 positive.

Since, in the present sensor, the quantity of charges flowing to the external circuit when in the signal reading operation is $C_1 Q_S/(C_1+C_2)$, the sensitivity becomes higher for the smaller capacity $C_2$ relative to the capacity $C_1$. It is therefore desirable that the first photoconductor 201 have a higher electrostatic capacity than that of the second photoconductor 202.

The photo-sensor according to the present invention and its operating method will be described in detail below in connection with the embodiment thereof.

EMBODIMENT 1

Figure 5:
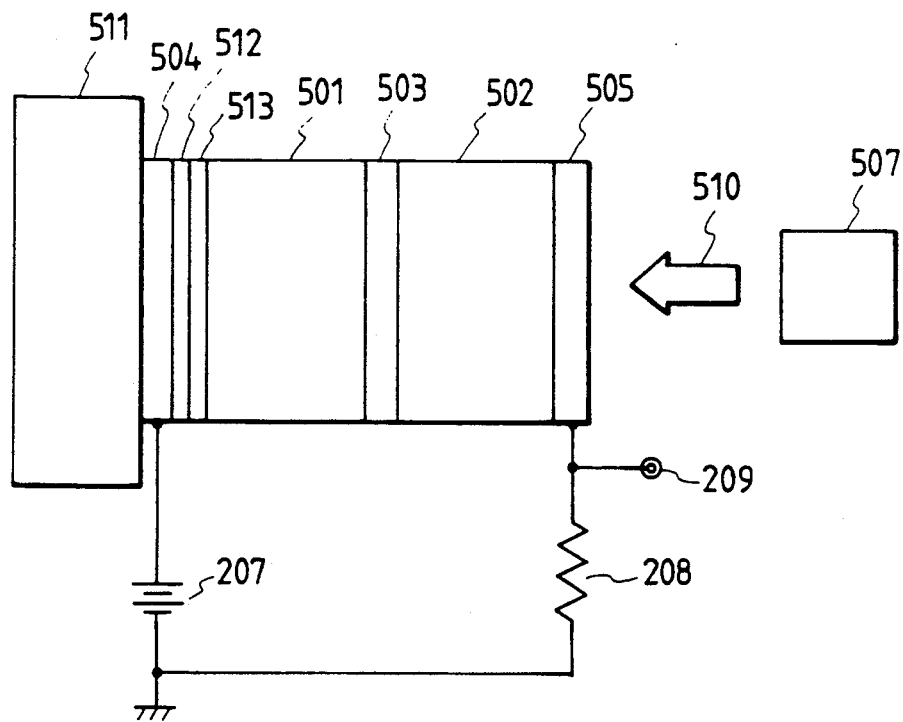
FIG. 5 is a diagram for explaining one embodiment of the photo-sensor according to the present invention and shows one example of a hole injection blocking structure.

FIG. 5 shows a first embodiment of the present invention. Over a transparent glass substrate 511, a first electrode 504 made of a transparent conductive layer composed mainly of tin oxide and a hole injection blocking layer composed of a $GeO_2$ layer 512 having a thickness of 15 nm and a $CeO_2$ layer 513 having a thickness of 15 nm are formed by the CVD and evaporation methods, respectively. Next, they are placed in an evaporator having Se and $In_2O_3$ as an evaporation source and are evaporated with a first photoconductor 501 of about 4 μm made of amorphous Se, an electron storage layer 503 of about 20 nm made of Se as a parent material and mixed with $In_2O_3$ of about 2,000 ppm, and a second photoconductor 502 of about 4 μm made of amorphous Se. Subsequently, a semi-transparent electrode of about 15 nm made of Au is deposited to form a second electrode 505. In the sensor thus formed, the first electrode 504 is arranged at the incidence side of the incident light and connected with a DC source 207, and a voltage is applied in such a direction that the first electrode 504 may take a higher potential than that of the second electrode 505. Since, at this time, the hole injection blocking layers 512 and 513 made of $GeO_2$ and $CeO_2$ are provided, no hole is injected from the first electrode 504 into the first photoconductor 501. On the other hand, the junction between the amorphous Se layer 502 and the Au 505 has a function to block the injection of electrons from the Au. Since, moreover, the amorphous Se layer 503 having $In_2O_3$ mixed acts as an electron capture layer, the electrons generated in the second photoconductor 502 are not injected into the first photoconductor 501 but are captured and stored in the electron storage layer 503. In the present embodiment, a signal reading light 510 is exemplified by a laser beam which is focused to about 40 μm and prepared by a dye laser 507 having a wavelength of 470 to 550 nm. The laser beam has excellent directivity and monochromy so that it can be suitably used as the reading light. If the optical source 507 is exemplified by a semiconductor laser, the sensor can be made small and light.

In the present embodiment, the following materials may be added to the carrier capture layer made of amorphous selenium as a parent material. In order to give the hole capture ability to selenium, specifically, it is advisable to add alkali metal elements, alkaline-earth elements Tl, LiF, NaF, $CaF_2$, $MgF_2$, Al, $F_3$, $MnF_3$, $CoF_2$, $PbF_2$, $BaF_2$, $CeF_3$ and TlF. In order to give the electron capturing action to the amorphous selenium, on the other hand, it is also advisable to add halogen, O, In, Ge, CuO, $In_2O_3$, $SeO_2$, $V_2O_5$, $MoO_3$, $WO_3$, $GaF_3$ or $InF_3$. Incidentally, in order to prevent the amorphous selenium from crystallizing, it is effective to mix several % of arsenic.

EMBODIMENT 2

A transparent conductive layer composed mainly of indium oxide is formed as the first electrode over a transparent substrate. After this, the first photoconductor of ZnSe and the second photoconductor of ZnTe are deposited to have a thickness of 0.1 to 10 μm by the vacuum evaporation. Next, the electron injection blocking layer of $SiO_2$ is deposited to have a thickness of 5 to 30 nm by the sputtering method, and the semi-transparent electrode of Au is evaporated to form the second electrode. An electric field is applied to the photo-sensor thus formed, in such a direction that the first electrode may be positive whereas the second electrode may be negative. In the junction between the ZnSe and ZnTe used in the present embodiment, a conduction band is formed with a potential barrier for blocking the migration of electrons from the ZnTe to the ZnSe, and the valence electron band is formed with a potential barrier for blocking the migration of holes from the ZeSe to the ZnTe. Thus, if the electric field of the aforementioned direction is applied and if the ZnTe is irradiated with the second light, the resultant photo-electrons do not migrate into the ZnSe but are stored in that junction. If, in this state, the first light is received by the ZnSe, the resultant holes do not migrate into the ZnTe but are recombined with the aforementioned stored electrons at the junction to reduce the quantity of the stored electrons. While this reduction is supplied by irradiating the ZnTe with the second light, the operations of the photo-sensor of the present embodiment are achieved by reading out the signals to the external circuit.

EMBODIMENT 3

A transparent conductive film composed mainly of iridium oxide is formed over a transparent substrate by the sputtering method. Next: an amorphous silicon carbide (a-$Si_{70}C_{30}$:H) containing hydrogen is deposited to have a thickness of about 4 μm by using $SiH_4$ and $CH_4$ as material gases by the plasma CVD method; an a-Si :H is deposited thereover to have a thickness of about 100 nm by the plasma CVD method of $SiH_4$; and an a-$Si_{70}C_{30}$:H is deposited thereover to have a thickness of about 4 μm by the method like the above method. Subsequently, an amorphous silicon nitride (a-SiN :H) is deposited to have a thickness of about 10 nm by the plasma decomposition of mixture gases of $SiH_4$ and $NH_3$, and a semi-transparent Al electrode is evaporated.

The photo-sensor thus formed according to the present embodiment is operated by applying a constant voltage in such a direction with the transparent substrate at the incidence side of the signal light that the iridium oxide may be negative whereas the Al may be positive. The iridium oxide is a P-type transparent electrode to form a rectifying contact with the a-$Si_{70}C_{30}$:H to block the injection of the electrons from the transparent electrode. On the other hand, the a-Si : N : H is provided as a potential barrier layer for blocking the injection of the holes from the Al electrode to the a-$Si_{70}C_{30}$. Since the a-Si :H forming the intermediate region has a narrower band gap than that of the a-$Si_{70}C_{30}$ acting as the first and second photoconductors, the holes generated in the second a-$Si_{70}C_{30}$ by the reading light incident through the semi-transparent Al electrode are stored in the potential bottom in the a-Si :H layer. When, in this state, the signal light is incident upon the first a-Si$_{70}$C$_{30}$:H layer, the resultant photoelectrons migrate into the a-Si :H layer to recombine with the aforementioned stored holes to reduce them so that the signals are read out to the external circuit in the procedure for supplying the reduction by the irradiation with the reading light.

EMBODIMENT 4

A transparent conductive film composed mainly of tin oxide is formed over a transparent substrate by the CVD method. After this, a hole injection blocking layer of CeO$_2$, a first photoconductor of amorphous Se having a thickness of 2 μm, and a second photoconductor of AlF$_3$ having a thickness of 20 nm and amorphous Se having a thickness of 2 μm are formed by the vacuum evaporation. Finally, a semi-transparent second electrode of Au is evaporated to form the photo-sensor of the present embodiment. When the photo-sensor of the present embodiment is to be operated, a DC source is connected in a direction to make the tin oxide of the first electrode positive, and the first photoconductor is first optically irradiated. As a result, the optically generated holes are stored in the first photoconductor of AlF$_3$ acting as the insulator of the intermediate region. If the second photoconductor is then sufficiently irradiated with the reading light, the electrons are stored at the reading light side of the AlF$_3$ so that the voltage to be applied to the AlF$_3$ rises. When this voltage reaches about 6 V, a breakdown occurs to start the recombination of the electrons and holes stored at the two sides of the AlF$_3$. Finally, the quantity of the electron-hole pairs are so determined that no electric field is applied to the second photoconductor whereas the voltage immediately before the breakdown is applied to the insulating layer AlF$_3$, until the sensor reaches an equilibrium for the reading light. Thus, the present sensor can be prepared to repeat the writing of the signals in response to the incident light and the reading by the reading optical irradiation. Incidentally, the present embodiment is exemplified by using the AlF$_3$ as the insulator of the intermediate region. The AlF$_3$ can be suitably replaced by an oxide such as SiO$_2$, MgO, WO$_3$, GeO$_2$ CaO, a fluoride such as MgF$_3$, CaF$_3$, LiF, CeF$_3$, BaF$_2$ or SrF$_2$, or an amorphous silicon carbide or nitride containing at least one of hydrogen and silicon nitride. Moreover, the insulator of the intermediate region may be made of two or more materials.

EMBODIMENT 5

Figure 7:
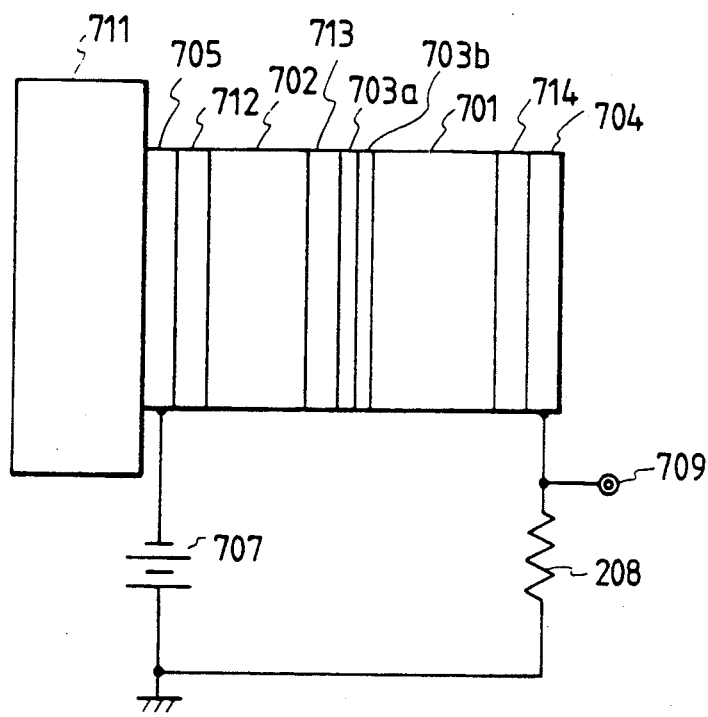
FIG. 7 is a diagram for explaining one embodiment of the photo-sensor according to the present invention and illustrates an application of a first photoconductor.

A fifth embodiment of the present invention will be described with reference to FIG. 7. A transparent second electrode 705 composed mainly of In, Sn and O is formed over a transparent glass substrate 711 by the sputtering method. Over the second electrode 705, a P-type a-Si :H layer 712 of about 50 nm, an i-type a-Si :H layer 702 of about 1 nm, and an n-type a-Si :H layer 713 of about 30 nm are deposited sequentially in the recited order by high-frequency plasma decomposition using mixture gases of SiH$_4$ and H$_2$-based B$_2$H$_6$, SiH$_4$, and mixture gases of SiH$_4$ and H$_2$-based PH$_3$. Next, an Al layer 703$a$ of 20 nm, and Au layer 703$b$ of 50 nm and an amorphous Se layer 701 of 2 μm are evaporated. Moreover, a hole injection blocking layer 714 of CeO$_2$ is deposited, and a semi-transparent Al electrode 704 of 15 nm is finally deposited by the evaporation. In the photo-sensor of the present embodiment, an electric source 707 is connected in such a direction that the Al electrode 704 for receiving the signal light may be positive. If the amorphous Si layer 702 acting as the second photoconductor is irradiated with the reading light, the resultant photo-electrons migrate toward the amorphous Se layer 701 but are blocked from migrating into the amorphous Se layer by the function between the Au layer 703$b$ and the amorphous Se layer 701 so that they are stored in the Al/Au layers 703$a$ and 703$b$. The Al layer 703$a$ prevents the Au from diffusing into the n-type a-Si :H layer 713. In the present embodiment, the voltage of the DC source 707 is set at about 240 V. In the light receiving state in which that voltage is being applied to the amorphous Se layer 701, the avalanche multiplications of the carriers are caused in the amorphous Se layer 701 so that an especially high sensitivity can be obtained. These avalanche multiplications will be described later in detail with reference to FIG. 10. In the present embodiment, like Embodiment 2, the avalanche multiplication coefficient by the holes is higher than that by the electrons, and the amorphous Se having a large carrier range for the holes is used to make the first conductor in which mainly the holes migrate whereas the amorphous Si having a large carrier range for the electrons is used to make the second conductor in which mainly the electrons migrate, so that especially excellent characteristics can be obtained. If the second photoconductor is made of the pin junction of the a-Si :H like the present embodiment, there can be attained an advantage that the signals can be promptly read out with a sufficiently high charge current in case the voltage to be supplied to the second photoconductor by the stored signal is low.

Since, in the present invention, the Al/Au layer is used to make the carrier storing region, the image of an incident X-ray can be converted into electric signals varying with time by integrating a multiplicity of sensors in a single glass substrate and by sequentially reading out the signals stored in the individual sensors. The reading light may be exemplified by sequentially lighting a green LED for each sensor. Thus, in the photo-sensor according to the present invention and its operating method, it is preferable to provide an LED and an EL light emitting element at each picture element.

Next, the photo-sensor according to the present invention and its operating method will be described in detail in the following in connection with the embodiment directed to the mode in which the photo-sensor and its operating method are applied to an X-ray imaging device and its operating method.

Figure 9A:
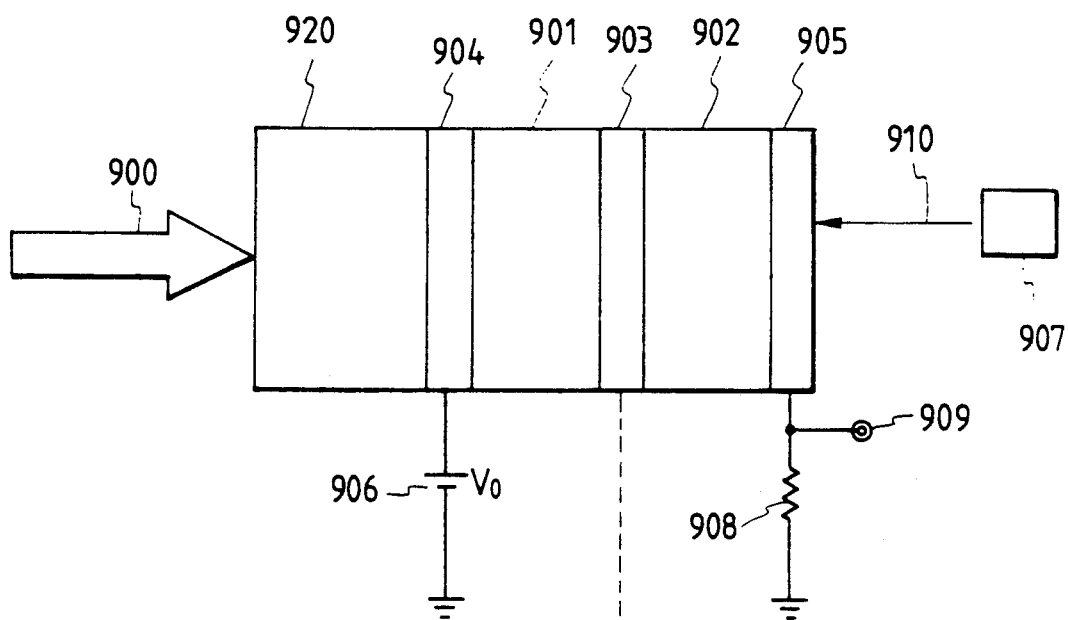
FIGS. 9A and 9B are diagrams for explaining one embodiment of the photo-sensor according to the present invention and illustrate the structure of the photo-sensor and the electric field in the photo-sensor, respectively.
Figure 9B:
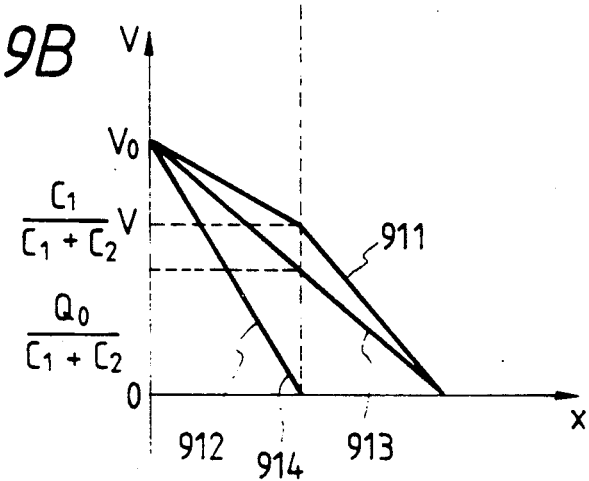

FIGS. 9A and 9B are diagrams for explaining the fundamental structure of the photo-sensor, in which the present invention is applied to the technical field of the X-ray photography, and the operating principle of the photo-sensor.

In FIG. 9A: reference numeral 920 designates a fluorescent element for converting the intensity of the X-ray into the fluorescent intensity; numerals 904 and 905 designate first and second transparent electrodes; and numerals 901 and 902 designate first and second photoconductors making rectifying contacts with the first and second transparent electrodes 904 and 905, respectively, for blocking the injections of the carriers from the two electrodes 904 and 905 into the two photoconductors 901 and 902. Numeral 903 designates an intermediate section having a function to establish at least the storage and recombination of the carriers. In case the X-ray is incident directly upon the photoconductors, the layer thickness has to be increased so as to attain a sufficient detection efficiency. In case the photoconductors are made of amorphous selenium, the layer thicknesses are 138 μm and 265 μm, and the electron generation efficiencies are 510 (eV/IP)(V/μm) and 555 (eV/IP)(V/μm), respectively (as referred to pp. 364 to 371 of Reports of William D. Fender of SPIE, Vol. 70 (1975)). Since, moreover, the W value (i.e., the energy necessary for generating the electron-hole pairs) is described to be 7 eV, the electric fields of 73 (V/μm) and 79 (V/μm) have to be applied to the two ends of the amorphous selenium, respectively, so as to raise the charge collection efficiency to 100%. In order to attain a sufficient detection efficiency when the incident X-ray is directly detected by the photoconductor, the layer thickness of the amorphous selenium required is 0.3 to 0.5 mm within the energy region of the medical X-ray. Since, under these conditions, the applied voltage is as high as 22 to 36 KV, the device not only becomes expensive but also has a danger such as a voltage leakage or an electric shock so that it requires careful handling.

In case, on the other hand, the device is used under an applied voltage (5 KV) and with a film thickness (0.5 mm) similar to those of the electronic photography of the prior art, the electric field is 10 V/μm so that the energy required for one carrier is about 50 eV. Since the W value of the amorphous selenium is 7 eV, the charge collection efficiency is estimated to be 14% raising a problem of the drop of the S/N ratio leading to the drop of the quantity of the signal charge.

This problem can be solved by using the fluorescent element like the present embodiment. Moreover, the avalanche multiplications of the amorphous selenium can be used especially effectively, as will be described hereinafter.

FIG. 9B is a diagram illustrating the potential distributions in the X-ray detector at the individual steps of the operations of the photo-sensor shown in FIG. 9A. The description to be made in detail in the following is directed to the case in which the carriers to be stored by an intermediate section 903 are electrons. First of all, a voltage $V_0$ is applied by a battery 906 between first and second electrodes 904 and 905. At this time, the potential distribution takes a form, as indicated at 911 in FIG. 9B. The potential of the intermediate region 903 takes the value of $C_1 V_0/(C_1+C_2)$ which is determined by dividing the voltage $V_0$ by the electrostatic capacities of two photoconductors 901 and 902.

Next, if the second photoconductor 902 is optically irradiated, it generates the electron-hole pairs so that the electrons and holes migrate to the left and right, respectively, in accordance with the electric field. Of these, the electrons reach the intermediate region 903 and are stored therein so that the potential difference between the two ends of the second photoconductor becomes zero to establish equilibrium. If the first photoconductor 901 has the electrostatic capacity $C_1$, the charges of $-C_1 V_0$ are stored in the intermediate section 903 so that the potential distribution takes a form, as indicated at 912 in FIG. 9B. Thus, the preparations for recording the X-ray are completed.

Next, if the X-ray is incident upon a fluorescent element 920, as indicated at arrow 900 in FIG. 9A, interactions occur so that a fluorescent light is generated by the fluorescent element 920. This fluorescent light is incident upon the first photoconductor 901 through the electrode 904 to generate electron-hole pairs. Of these, the holes migrate to reach the intermediate section 903 until they are recombined with the electrons. By these operations, the potential of the intermediate section 903 rises to $Q_O/(C_1+C_2)$, and the potential distribution obtained takes a form, as indicated at 913 in FIG. 9B. Here, letters $Q_O$ and $C_2$ designate the quantity of the charge generated and the electrostatic capacity of the second photoconductor, respectively.

Next, if the second photoconductor 902 is irradiated with a reading light 910 from an optical source 907, the electron-hole pairs are generated by the interactions so that the electrons for eliminating the quantity $Q_O$ of the charges obtained by the X-ray irradiation migrate to the intermediate section 903 to establish an equilibrium. On the other hand, the holes migrate toward the second electrode 905 and flow through a load 908 so that an output is obtained from a terminal 909 connected with that load. As a result, the recorded information is read out so that the potential distribution at the end of this reading takes a form, as indicated at 914 in FIG. 9B, to restore the prepared state 912 for the X-ray irradiation. As a result, at each picture element, a subsequent X-ray recording can be restarted immediately after the reading of the X-ray image information.

Like the image pickup tube, for example, the storing and reading timings of the signals are sequentially shifted for each picture element so that the successively incident X-ray image can be converted into the electric signals. This photo-sensor requires neither electric nor mechanical switching operations, as different from the prior art, so that the X-ray image can be promptly read out. If this method is utilized, it is possible to accomplish the fluorography which is one of the X-ray imaging technologies used in the prior art.

Figures 10, 11:
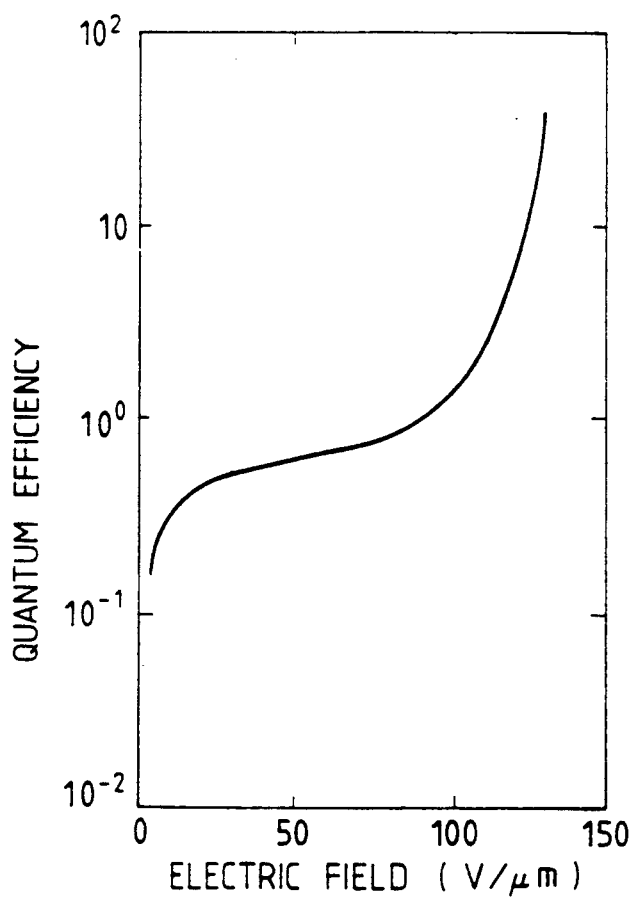
FIGS. 10 and 11 are diagrams for explaining avalanche multiplications in an amorphous semiconductor which are effective when used in the photo-sensor according to the present invention.

FIG. 10 is a diagram showing the characteristics for evaluating the signals obtained by the present photo-sensor and illustrates the quantum efficiency of the amorphous selenium for the light. The quantum efficiency of the amorphous selenium having a thickness of 2 μm is plotted against the electric field applied. The quantum efficiency increases gradually for the electric field of 20 V/μm to 100 V/μm but steeply for the electric field over 100 V/μm. This region exceeding 100 V/μm is called the "avalanche region". In the avalanche phenomena, the amorphous selenium and the light interact so that the resultant carriers are accelerated by the high electric field to excite the surrounding amorphous selenium to breed the carriers. In this region, the quantum efficiency is increased to amplify the signals. We have calculated the signal charges $Q_S$ by approximating the quantum efficiency of the avalanche or lower region by an exponential function. As a result, in a low exposure region of the X-ray photography, for example, the following equation (7) is obtained:

$$Q_S = (E_0 E_1 \, _0 e^{V_0})/h \, _0 \cdot e f k X \cdots \qquad (7).$$

Here, letters $E_0$, $E_1$ and $h_0$ designate the energy conversion efficiency, the optical transmission efficiency and the energy of generated fluorescence photons of the fluorescent element, respectively. On the other hand, letters of $_0 e^{V_0}$ designate the quantum efficiency under the applied voltage $V_0$.

FIG. 11 is a diagram for comparing the signal charges of the respective systems of the photo-sensors of the present invention and the prior art.

Of the three modes of the examples for comparison in case the prior art is used, as described in the background art, it is found from FIG. 11 that the signal charges of the first and third modes are 0.02 fkeX whereas the signal charge of the second mode is 0.04 fkeX. On the contrary, the signal charge (for the quantum efficiency of 1.0) of the present photo-sensor within the avalanche region is 0.3 fkeX, and the signal charge (for the quantum efficiency of 1.0) of the present invention in the plateau region is 0.03 fkeX.

Thus, in the plateau region of the present invention, substantially the same signal charge as those of the prior art example can be obtained. If the avalanche region is used, moreover, more signal charges than those of the prior art can be obtained to give image information of high S/N ratio.

In the present invention, moreover, the X-ray having transmitted through the fluorescent element is incident directly upon the first photoconductor to interact therewith so that the signal charges are generated and added to the signal charges generated by the fluorescent element. Thus, there can be attained an additional effect that more signal charges can be produced.

EMBODIMENT 6

Figure 12:
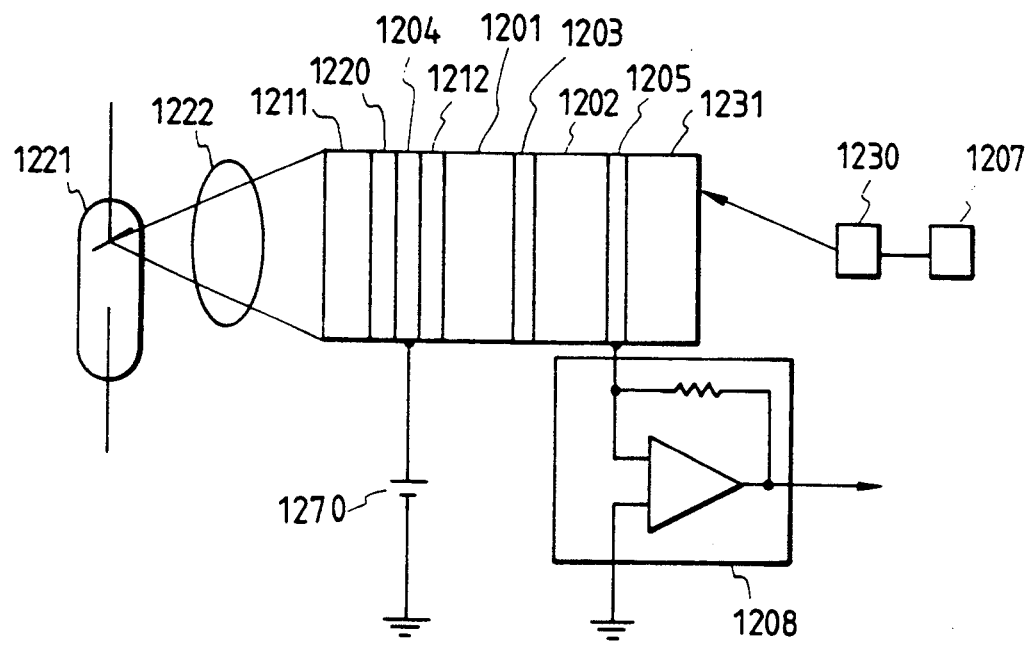
FIGS. 12 and 13 are diagrams for explaining the mode in which the photo-sensor according to the present invention is applied to an X-ray imaging device.

FIG. 12 is a diagram showing the structure of the X-ray imaging device according to a sixth embodiment of the present invention.

In FIG. 12: reference numeral 1221 designates an X-ray source; numeral 1222 an object to be imaged; numeral 1211 a support substrate for supporting the imaging device; numeral 1220 a fluorescent element; numerals 1204 and 1205 designate transparent electrodes; numeral 1212 a carrier injection blocking layer; numerals 1201 and 1202 first and second photoconductive layers, respectively; numeral 1203 an intermediate layer having a function to store the carriers and forming a major part of the fluorescent detector; numeral 1231 a glass substrate upon which is incident a reading light; numeral 1270 a positive battery; numeral 1208 an output circuit of signal charges when in the reading operation; numeral 1207 a reading optical source; and numeral 1230 a scanning unit for the reading.

The X-ray generated by the X-ray source 1221 transmits through the object 1222 and comes into the X-ray imaging device according to the present invention. This X-ray imaging device is constructed of a radiation (or X-ray) detector, a signal light (or fluorescent light) detector and a reader. The X-ray detector is composed of the substrate 1211 and the fluorescent element formed over the substrate 1221 for generating the fluorescent light when the X-ray is incident thereupon. The substrate 1211 is made of a material having a little X-ray absorption and selected from a polymer resin or a metal such as a light element. In the present embodiment, an aluminum layer of 2 mm is selected in consideration of its mechanical strength. The fluorescent element 1220 is selected from one of alkali halide of NaI or CsI activated with Tl or Na, an activated alkali earth fluorohalide phosphor or alkalihalide phosphor such as BaFCl : $Eu^2$, or an inorganic scintillator such as $CaWO_4$, $Gd_2O_2S$ : Pr, Ce or F. In the present embodiment, a radiographic screen is selected from commercially available BaFCl : $Eu^2+$. Moreover, the layer thickness may be sufficient for shielding the incident X-ray, i.e., within a range of 0.1 to 1 mm and may desirably be 0.3 mm. Next, the fluorescent light produced in the fluorescent element 1220 is detected and recorded by the fluorescent detector. This fluorescent detector is composed of the electrodes 1204 and 1205, the carrier injection blocking layer 1212, the photoconductive layers 1201 and 1202, the intermediate layer 1203 and the glass substrate 1231. The fluorescent detector is obtained by laminating over the transparent glass substrate 1231 sequentially in the recited order: the semi-transparent layer (i.e., the second electrode) 1205 of about 15 nm made of gold (Au); the second photoconductive layer 1202 made of amorphous selenium; the electron storage layer (i.e., the intermediate layer) 1203 of about 20 nm made of selenium as a parent material and containing $In_2O_3$ of about 2,000 ppm; the first photoconductive layer 1201 made of amorphous selenium; the hole injection blocking layer 1212 made of $CeO_2$; and the transparent conductive layer (i.e., the first electrode) 1204 made mainly of tin oxide.

The first photoconductive layer 1201 has its thickness determined by considering the effects (a) to block the incident fluorescent light sufficiently, (b) to attain a sufficient quantum efficiency when operated in the avalanche region, and (c) to detect the X-ray transmitted through the fluorescent element 1220 even at the first photoconductive layer 1201 so that the signal charges can be increased. Since the light and X-ray absorption coefficients of the amorphous selenium are about $10^5$/cm and 18/cm (50 eV), respectively, the layer thickness of the amorphous selenium may be within a range of 0.1 $\mu$m to 500 $\mu$m, desirably, within a range of 1 $\mu$m to 200 $\mu$m. In the present embodiment, the thickness of the first photoconductive layer 1201 is set at 2 $\mu$m, ignoring the signal increasing effect due to the X-ray absorption. Moreover, the layer thickness is set within a range of 0.5 $\mu$m to 100 $\mu$m, desirably, within a range of 0.5 $\mu$m to 10 $\mu$m, if it is considered that the stored charges are released to drop the signals by the interactions between the second photoconductive layer 1202 and the incident X-ray and that the charges are stored in the capacitor constructed of the first and second photoconductive layers. In the present embodiment, the second photoconductive layer 1202 has its thickness set at 1 $\mu$m.

The X-ray detector and the fluorescent detector are constructed in close contact so as to prevent the loss of the generated light photons and the deterioration in the resolving power. By the DC source 1270, moreover, a voltage is applied in such a direction that the potential of the first electrode 1204 may be higher than that of the second electrode 1205. Since, in this case, there is formed the hole injection blocking layer 1212 made of $CeO_2$, no hole is injected from the first electrode 1204 into the first photoconductive layer 1201. Nor is any electron injected from the electrode 1205 into the second photoconductive layer 1202 because the junction between the amorphous selenium and the gold has a function to block the injection of the electrons from the gold. Since, moreover, the amorphous selenium layer (or the intermediate layer) 1203 containing $In_2O_3$ acts as the electron capture layer, the electrons generated in the second photoconductive layer 1202 are not injected into the first photoconductive layer 1201 but stored in the intermediate layer 1203. The reader is composed of the optical source 1207, the scanner 1230 and the signal output circuit 1208. This output circuit 1208 will be described hereinafter.

EMBODIMENT 7

Figure 6:
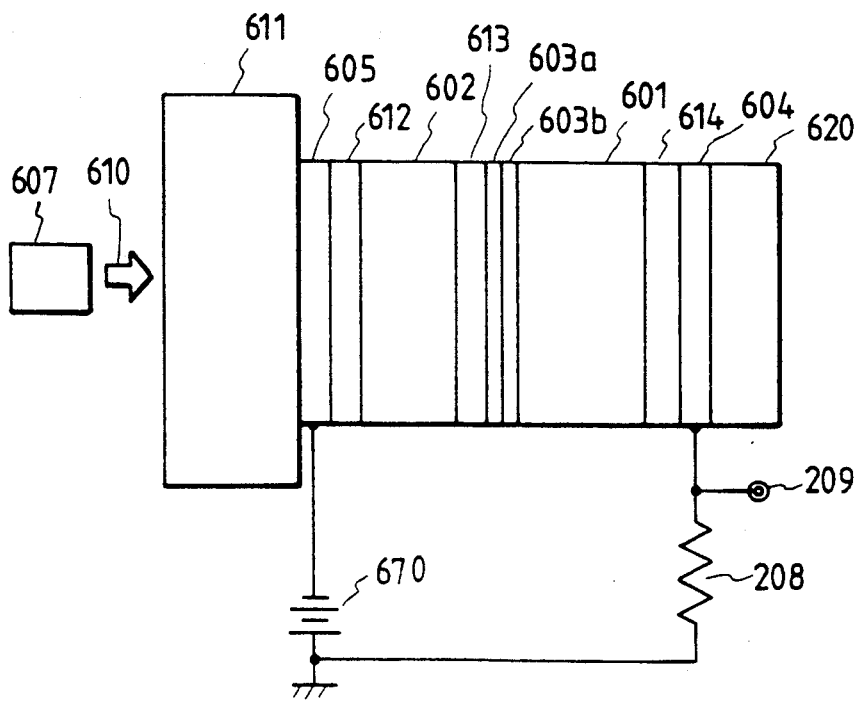
FIG. 6 is a diagram for explaining one embodiment of the photo-sensor according to the present invention and shows a structure suitable for obtaining a signal in response to a radiation.

A seventh embodiment of the present invention will be described with reference to FIG. 6. A transparent second electrode 605 composed mainly of In, Sn and O is formed over a transparent glass substrate 611 by the sputtering method. Over this second electrode 605, there are sequentially deposited: a P-type a-Si :H layer 612 of about 50 nm by the high-frequency plasma decomposition of mixed gases of $SiH_4$ and $H_2$-based $B_2H_6$, $Si_4$ and mixed gases of $SiH_4$ and $H_2$-based $PH_3$; an i-type a-Si :H layer 602 of about 1 $\mu$m; and an n-type a-Si :H layer 613 of about 30 nm. Next, there are deposited by the evaporation an Al layer 603a of 20 nm, an Au layer 603b of 50 nm, and an amorphous Se layer 601 of 2 um. Moreover, a hole injection blocking layer 614 made of $CeO_2$ and a semi-transparent Al electrode 604 of 15 nm. Finally, a fluorescent element 620 of 300 $\mu$m made of BaFBr is adhered to the electrode 604. In the photo-sensor according to the present embodiment, the X-ray is received by the fluorescent element 620, the emission of which is received by the amorphous Se layer 601 acting as the first photoconductor. An electric source 670 is connected in such a direction that the Al electrode 604 for receiving the light from the fluorescent element 620 may be positive. When the amorphous Si layer 602 acting as the second photoconductor is irradiated with a reading light 610 from the optical source 607, the resultant photo-electrons migrate toward the amorphous Se layer 601 but are blocked from migrating into the amorphous Se layer 601 by the junction between the Au layer 603b and the amorphous Se layer 601 and are stored in the Al/Au layers 603a and 603b. The Al layer 603a prevents the Au from diffusing into the n-type a-Si :H layer 613. In the present embodiment, the voltage of the DC source 607 is set at about 240 V like in Embodiment 5. In the receiving state in which that voltage is applied to the amorphous Se layer 601, the avalanche multiplication of the carriers occurs in the amorphous Se layer 601 so that an especially high sensitivity is obtained. In the present embodiment, too, especially satisfactory characteristics are obtained, because the amorphous Se, having a higher avalanche multiplication factor by the holes than that of the electrons and an excellent mobility of the holes, is used as the first photoconductor 601 mainly for migration of the holes whereas the amorphous Si having an excellent mobility of the electrons is used as the second photoconductors 612, 602 and 613 mainly for migration of the electrons. The other features are similar to those of Embodiment 5.

EMBODIMENT 8

Figure 8:
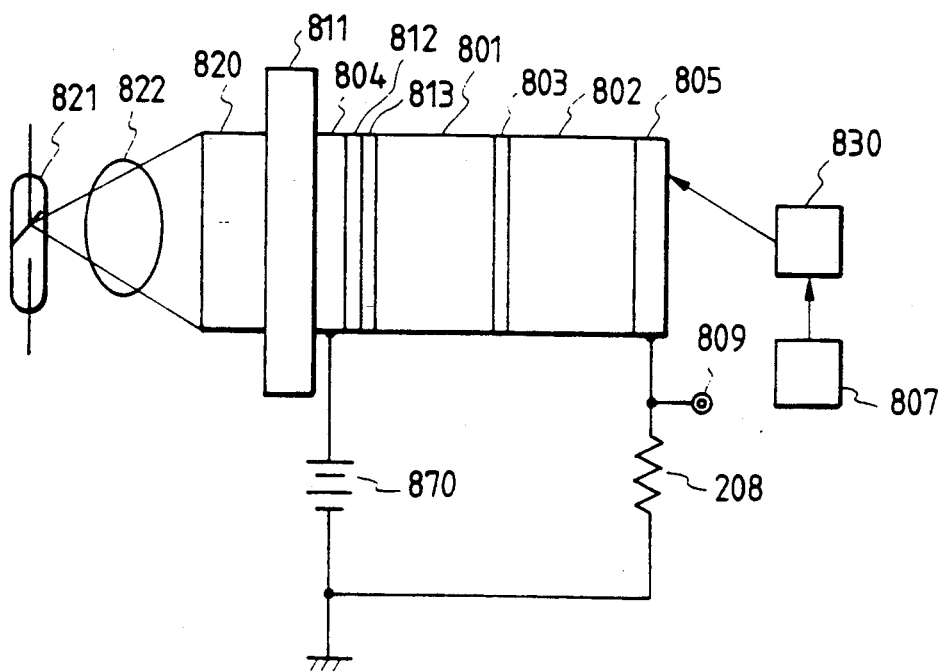
FIG. 8 is a diagram for explaining one embodiment of the photo-sensor according to the present invention and illustrates a mode in which the photo-sensor is applied to an X-ray imaging device.

FIG. 8 is a diagram showing an eighth embodiment of the present invention. The present embodiment is applied to an X-ray image detecting device used for medical purposes, by disposing a fluorescent layer at the side of the first photoconductor of the photo-sensor according to the present invention. Over a transparent glass substrate 811, there are formed by the CVD method and vacuum evaporation, respectively, a first electrode 804 made of a transparent conductive layer composed mainly of tin oxide, and a hole injection blocking layer composed of a $GeO_2$ layer 812 having a thickness of 15 nm and a $CeO_3$ layer 813 having a thickness of 15 nm. Next, this configuration is disposed in an evaporation chamber having Se and $In_2O_3$ as its evaporation source, and there are evaporated thereover a first photoconductor 801 of about 4 $\mu$m made of amorphous Se, an electron storage layer 803 of about 20 nm made of Se as a parent material and containing $In_2O_3$ of about 2,000 ppm, and a second photoconductor 802 of about 4 $\mu$m made of amorphous Se. Subsequently, a semi-transparent electrode 805 of about 15 nm made of Au is deposited to form a second electrode. Finally, a fluorescent element 820 of BaFBR having a thickness of 300 $\mu$m is adhered to the transparent glass substrate 811 of the photo-sensor thus constructed. In the photo-sensor according to the present embodiment, an X-ray generated by source 821 transmits through an object 822 and is then incident upon the fluorescent element 820, the emission of which is received by the amorphous Se layer 801 acting as the first photoconductor. A DC source 870 applies a voltage in such a direction that the potential of the first electrode 804 may be higher than that of the second electrode 805. Since, at this time, there are provided hole injection blocking layers 812 and 813 made of $GeO_2$ and $CeO_2$, no hole is injected from the first electrode 804 into the first photoconductor 801. Moreover, the junction between the amorphous Se layer 802 and the Au layer 805 has a function to block the injection of the electrons from the Au. Since, moreover, the amorphous Se layer 803 containing $In_2O_3$ acts as an electron capture layer, the electrons generated in the second photoconductor 802 are not injected into the first photoconductor 801 but captured and stored in the electron storage layer 803. The reading light used for irradiating the second photoconductor 802 is exemplified by a dye laser beam focused to about 50 $\mu$m and having a wavelength of 470 to 550 nm. The laser beam has excellent directivity and monochromy and is suitable for use as the reading light so that the sensor can be made small and light if a semiconductor laser is used, for example. In the present embodiment, the reading laser beam generated by the laser source 807 is scanned two-dimensionally by a scanner 830 composed of a polygon mirror scanner and a galvano mirror scanner in combination, and the pattern of the signal charges stored is read out so that the two-dimensional image information of the incidence X-ray is detected as electric signals from an output terminal 809.

EMBODIMENT 9

Figure 13:
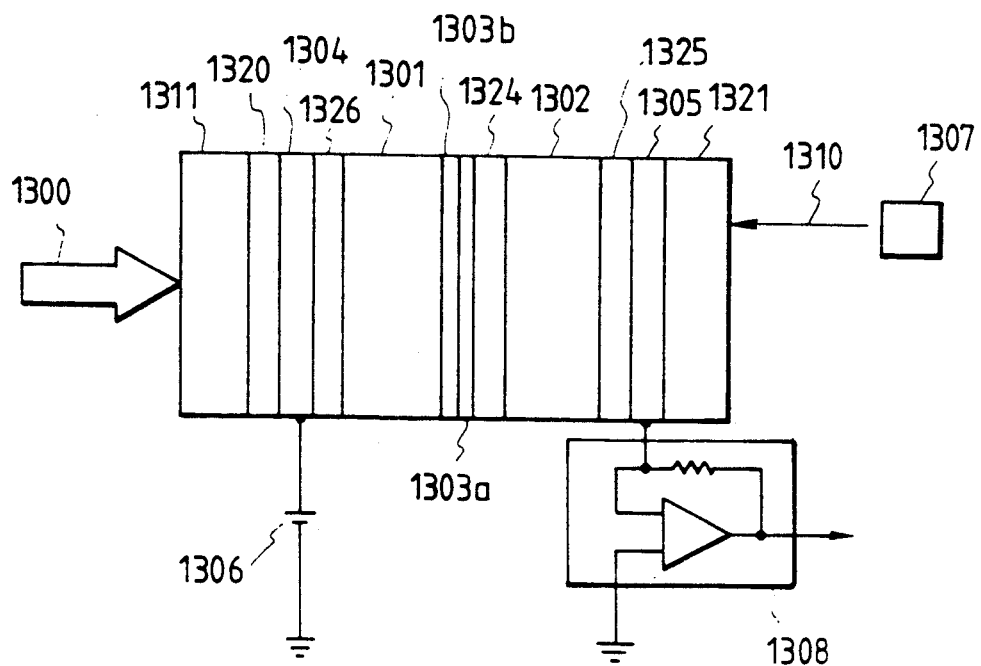

FIG. 13 is a diagram showing the structure of the X-ray imaging device according to the ninth embodiment of the present invention.

The structure of FIG. 13 is different from that of FIG. 12 in that a gold layer 1303b and an n-type a-Si layer 1324 are formed at the two sides of an aluminum layer 1303a acting as the intermediate layer and in that a p-type amorphous Si :H layer 1325 is formed between a second electrode 1305 and a second photoconductor 1302.

An X-ray 1300 having passed through an object is incident upon the X-ray detector of the X-ray imaging device. This X-ray detector is composed of a fluorescent element 1320 for converting the X-ray 1300 into a fluorescent light and a substrate 1311 for supporting the fluorescent element 1320. This fluorescent element 1320 is selected from the aforementioned fluorescent materials but is exemplified in the present embodiment by BaFC : $Eu^{2+}$ having a thickness of 300 $\mu$m. On the other hand, the substrate 1311 is selected from the aforementioned materials but is exemplified in the present embodiment by aluminum having a thickness of 2 mm.

Next, the fluorescent light generated in the fluorescent element 1320 is detected by the fluorescent detector and is recorded. This fluorescent detector is constructed by sequentially laminating over a transparent glass substrate 1321: the transparent second electrode 1305 made of In, Sn and O; the p-type amorphous Si :H layer 1325 of about 50 nm; the i-type amorphous Si :H layer 1302 of about 1 μm; the n-type amorphous Si :H layer 1324 of about 30 nm; the Al layer 1303a of about 20 nm; the Au layer 1303b of about 50 nm; the amorphous selenium layer 1301 of 2 μm acting as the first photoconductor; the hole injection blocking layer 1326 made of $CeO_2$; and the transparent electrode layer 1304 of about 15 nm made of Al. These X-ray detector and the fluorescent detector are held in close contact with each other so as to prevent the loss of generated light photons and the deterioration in resolving power.

Next, a voltage is applied in such a direction that the potential of the first electrode 1304 may be higher than that of the second electrode 1305. At this time, the hole injection blocking layer 1326 made of $CeO_2$ prevents the holes from being injected from the first electrode 1304 into the first photoconductor 1301. Of the electron-hole pairs generated in the second photoconductive layer 1302 made of amorphous silicon in response to the reading light emitted from an optical source 1307, the electrons are stored in the gold layer 1303b and the aluminum layer 1303a because the gold layer 1303b has a function to block the injection of the electrons into the amorphous selenium 1301 acting as the first photoconductive layer. The aluminum layer 1303a prevents the gold from diffusing into the n-type a-Si layer 1324. Even in case the voltage applied to the second photoconductor 1302 is low, the stored charges can be promptly read out by making the second photoconductive layer 1302 of the pin junction of amorphous silicon.

In the case of the single gold/aluminum layer 1303a, on the other hand, the stored charges migrate into the layer so that the electrode is constructed of a plurality of elements having a size corresponding to the picture elements to be read out. The signal charges obtained by the reading light 1310 are converted into voltage signals by an output circuit 1308. The detail of this output circuit 1308 will be described with reference to FIGS. 14 and following.

EMBODIMENT 10

Figure 14:
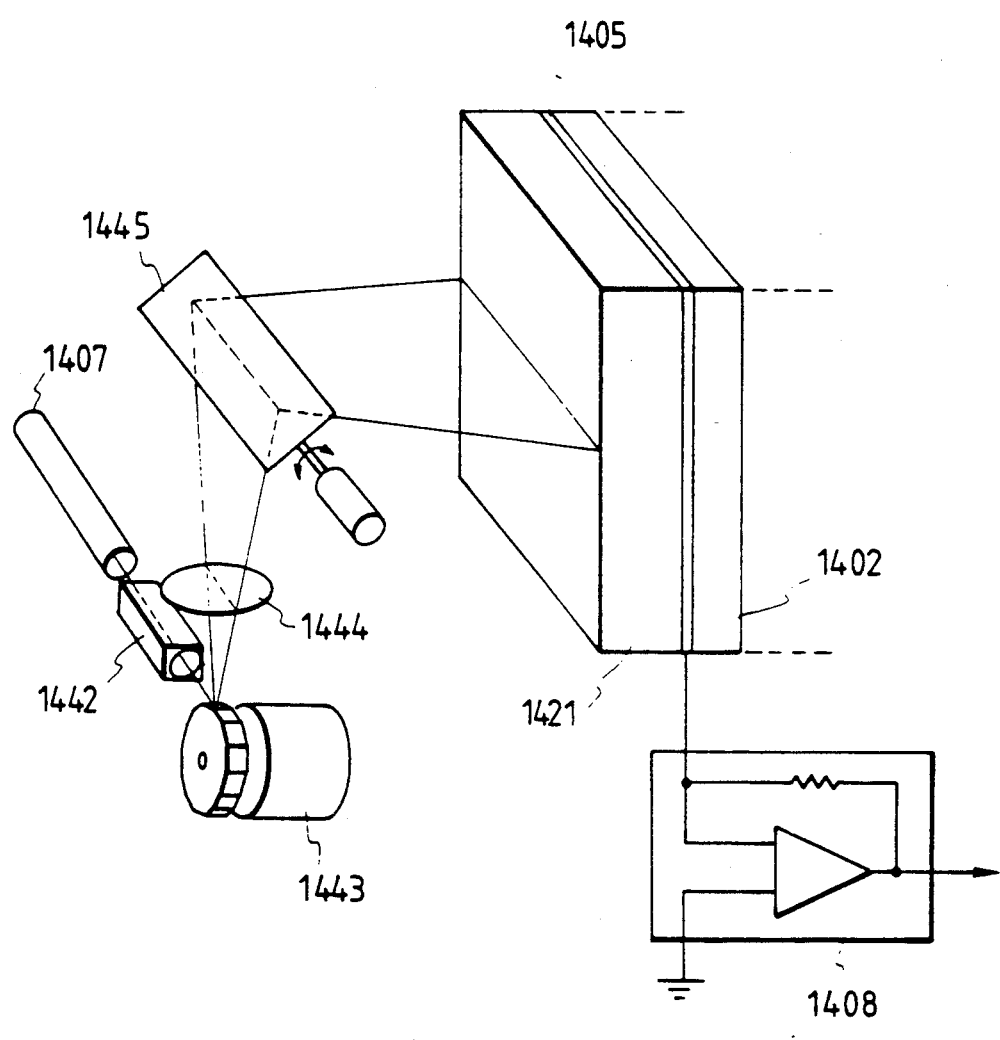
FIGS. 14, 15 and 16 are diagrams for explaining embodiments of the photo-sensor according to the present invention and illustrate the various modes of a signal reading unit.

FIG. 14 is a diagram showing the detail structure of a reader of the present invention.

In FIG. 14: reference numeral 1407 designates a laser source; numeral 1442 a beam shaping optical system; numeral 1443 a laser deflector; numeral 1444 an Fθ lens; numeral 1445 a galvano mirror; numeral 1421 a transparent glass substrate; numeral 1405 a transparent electrode; numeral 1402 a second photoconductive layer; and numeral 1408 an output circuit. Incidentally, the aforementioned intermediate layer and first photoconductive layer are held in close contact with the second photoconductive layer 1402, but the major portion of the fluorescent detector and the X-ray detector are not shown because they have no relation to the reader.

The reading optical beam generated by the laser source 1407 is incident upon the reshaping optical system 1442 and is scanned by the first optical beam deflector 1443 until it is focused on the second photoconductive layer 1402 of the fluorescent detector by the Fθ lens 1444. In order to scan the reading light two-dimensionally, moreover, second beam deflector 1445 is inserted between the Fθ lens 1444 and the transparent glass substrate 1421. The light source 1407 is selected by considering the spectroscopic sensitivity of the second photoconductive layer 1402. Moreover, the light source 1407 may desirably be the laser source having excellent directivity and monochromy. Since, in the eighth embodiment, the second photoconductive layer 1402, as shown, is made of amorphous selenium, the light source may desirably be a visible laser and may be exemplified by a dye laser having a wavelength of 470 to 550 nm. If the second photoconductive layer 1402, as shown, is made of amorphous silicon like the ninth embodiment, the semi-conductor laser can be used because it covers an infrared to visible range. Next, the first optical beam deflector 1443 can be exemplified by a polygon mirror scanner so as to realize high-speed scanning. Moreover, the second optical beam deflector 1445 can be exemplified by a galvano mirror scanner. Still moreover, the output current from the electrode 1405 is subjected to a current-voltage conversion by the output circuit 1408 until it is sent out to a downstream processor.

EMBODIMENT 11

Figure 15:
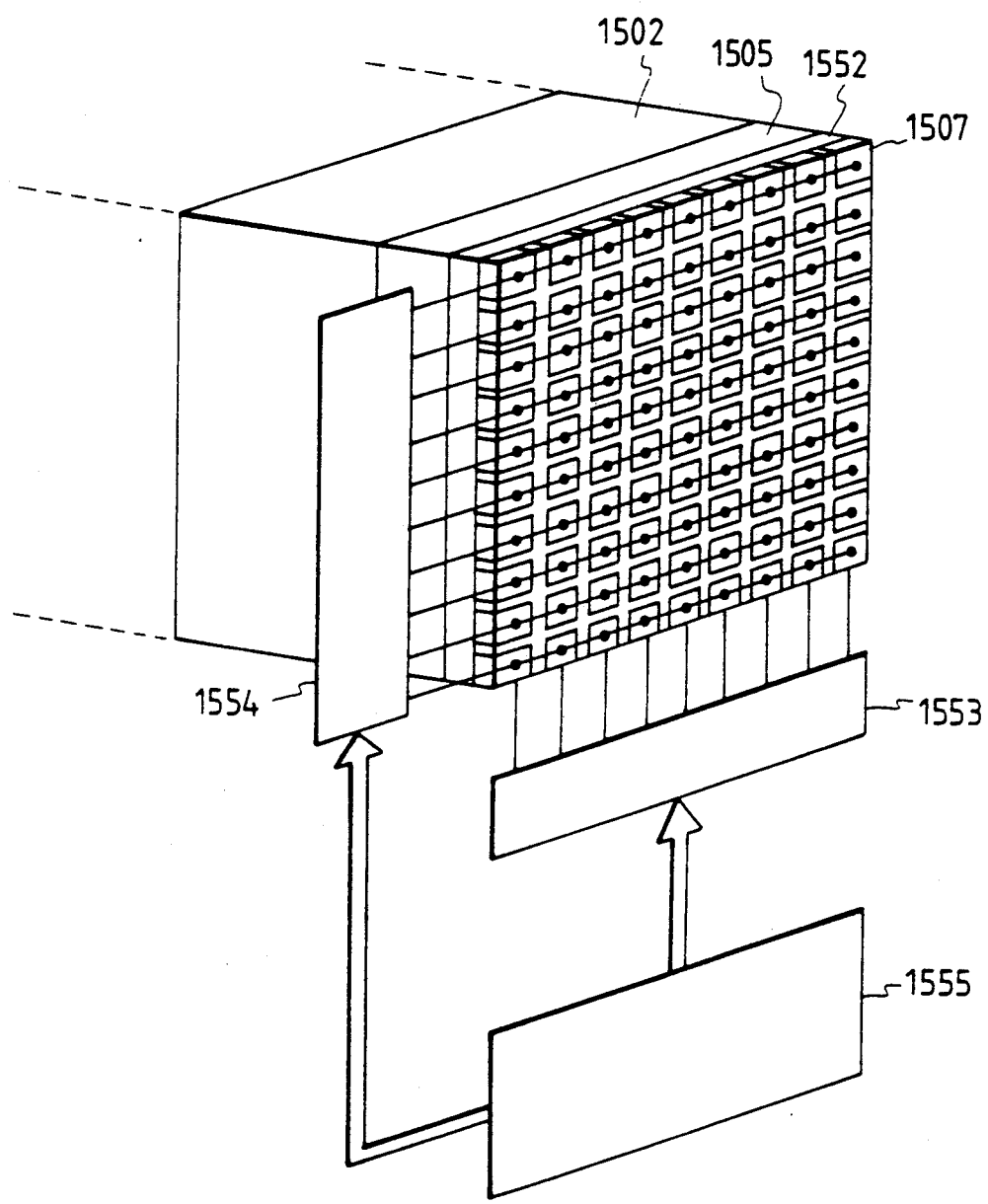

FIG. 15 is a diagram showing the structure of a signal reader according to another embodiment of the present invention.

In FIG. 15: reference numeral 1507 designates LEDs; numeral 1552 a transparent insulating layer arrayed in matrix with the LEDs 1507; numerals 1553 and 1554 optical source selectors at X and Y sides; numeral 1555 a scan control circuit; numeral 1505 a transparent electrode; and numeral 1502 a second photoconductive layer. Incidentally, the intermediate layer, the first photoconductive layer and the X-ray detector are not shown.

The signal reader according to the present embodiment is constructed by forming a layer, in which the optical sources 1507 having a size corresponding to one picture element are arrayed two-dimensionally, and the transparent insulating layer 1552 between the transparent glass substrate (1231 and 1321) of the eighth and ninth embodiments and the transparent electrode 1505. The optical source 1507 of at least one picture element is turned on by the X-direction selector 1553 and the Y-direction selector 1554. The light from the LED 1507 reaches the second photoconductive layer 1502 to release the stored charges. In the scan control circuit 1555, the two-dimensional scanning can be accomplished by sequentially moving the optical sources 1507. These optical sources 1507 are made of the LED or EL light emitting elements but are exemplified in the present embodiment by the LED having a wavelength suitable for the foregoing first and second embodiments.

EMBODIMENT 12

Figure 16:
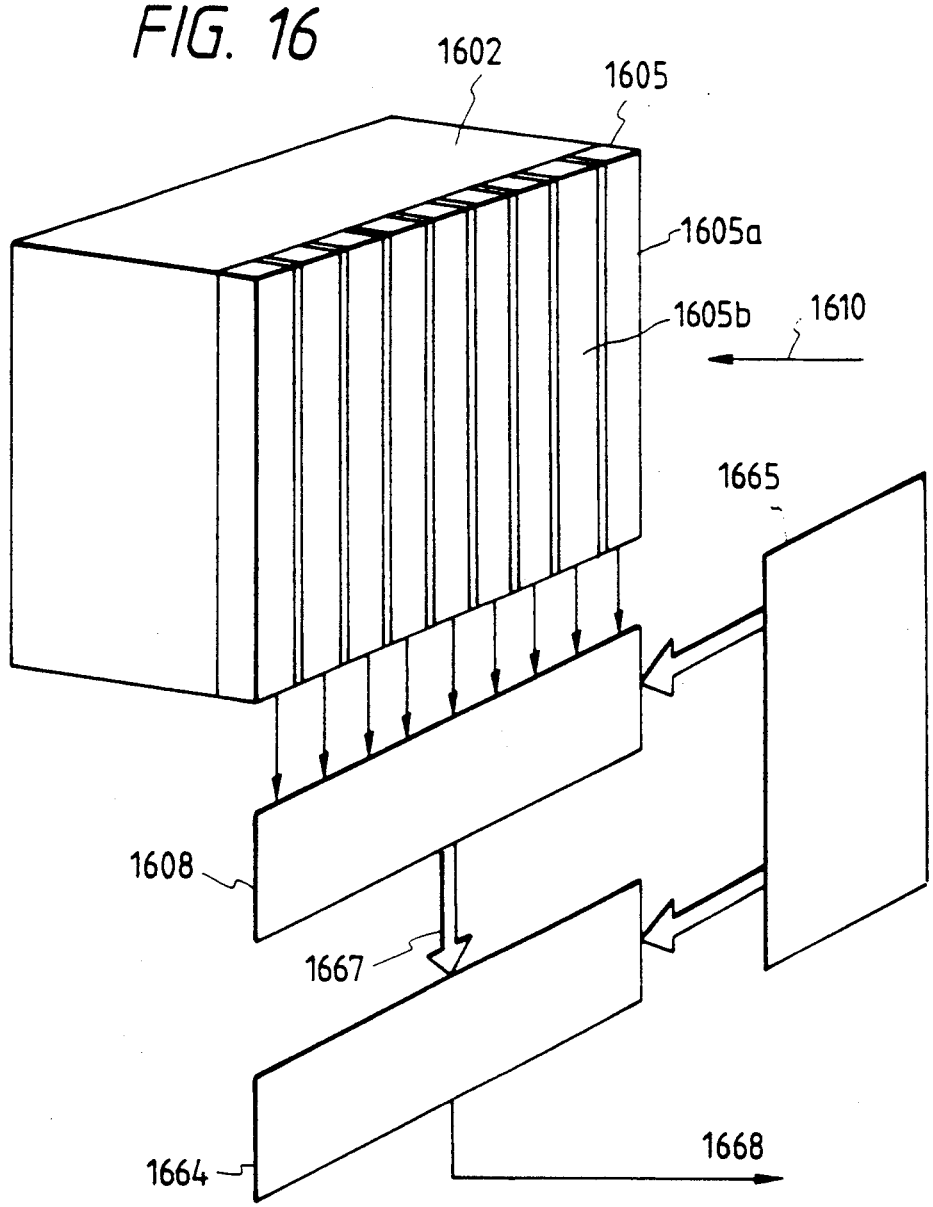
Figure 17:
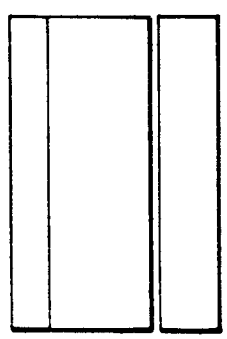
FIG. 17 is a diagram for explaining the photo-sensor of the prior art.

FIG. 16 is a diagram showing a structure of the signal reader, especially its second electrode portion according to still another embodiment of the present invention.

A second electrode 1605 is disposed in contact with a photoconductive layer 1602 of FIG. 2 and is composed of two or more elements 1605a, 1605b . . . , and so on, which are electrically insulated from one another but are in rectifying contacts with the second photoconductor layer 1602. The output charges from the individual electrode elements 1605a, 1605b, . . . , and so on, are subjected to a current-voltage conversion by an output circuit 1608, and the output voltage is held until a reset signal comes from a control circuit 1665. The output signal 1667 of each element is inputted to an analog multiplexer 1664, and an output signal 1668 of at least one channel is selected in accordance with the output channel selection circuit of the control circuit 1665 so that it is transmitted to a downstream processor. When the data 1667 of all the channels are read out, the reset signal is sent out from the control circuit 1665 to an output circuit 1608 so that the output potential held is set to start the subsequent reading of the stored charges.

In the present embodiment, a signal reading light 1610 is exemplified by a divergent beam. The divergent direction of the beam is set to cross the individual divided electrodes 1605a, 1605b, ..., and so on, desirably, perpendicular thereof so that the electrodes are scanned in their respective longitudinal directions. The electrodes thus divided reduce the capacity of the second photoconductor. By scanning the divergent beam one-dimensionally, moreover, the signal reading time is reduced to shorten the sensor operating time. The present embodiment is equipped with the optical source for emanating the divergent beam, the optical beam and the divergent beam producing means, although not shown.

In the several embodiments thus far described, the structure of the signal reading portion and its operation have been detailed. Their use should not be limited to the X-ray image pickup device but can naturally be applied likewise to another photo-sensor.

As has been described hereinbefore, the foregoing individual embodiments have succeeded in solving the problems of the present invention. That is to say, the first problem of shortening the preparation time is solved by eliminating the switching operations. Moreover, the second problem of applying no voltage to the insulators and the second photoconductive layers in the end state of preparing the signal light to enhance the charge collection efficiency and improve the S/N ratio is solved by enabling the intermediate region to store the carriers of the same polarity as that of the second electrode with respect to the first electrode and by selecting a proper photoconductive material. Thus, the applied voltage can be dropped so that no excess voltage is applied in the end state of preparing the signal light irradiation thereby to improve the charge collection efficiency. Moreover, the successive reading of each picture element can be realized by sequentially shifting the signal information storing and reading times for each picture element, because the unnecessary preparations are eliminated and because the preparations are ended by substantially equalizing the potential in the second photoconductive layer.

The photo-sensor according to the present invention can be practiced as a variety of imaging devices including a large-screen X-ray imaging device for medical inspections and for inspecting the flaws of structures. The applications are all imaging devices such as video cameras represented by TV broadcasting cameras or home video cameras, special cameras such as noctovision cameras or infrared cameras, or one-dimensional line sensors. Moreover, the features of the present invention indicate new applications to various fields.

What is claimed is:

1. A method of operating a photo-sensor having a first photoconductive region generating first charge carriers in response to irradiation of signal light and a second photoconductive region generating second charge carriers in response to irradiation by a reading light and an intermediate region disposed between said first and second photoconductive regions, said method comprising the steps of:
   (a) applying an electric field to said first and second photoconductive regions and irradiating said reading light on said second photoconductive region, thereby storing second charge carriers at the intermediate region, until a predetermined electric potential exists across said second photoconductive region;
   (b) irradiating said first photoconductive region with said signal light thereby generating first charge carriers in said first photoconductive region, said first charge carriers migrating to said intermediate region and thereby reducing the second charge carries stored at the intermediate region; and
   (c) irradiating said reading light on said second photoconductive region until said predetermined electric potential exists across said second photoconductive region.

2. The method of operating a photosensor of claim 1 wherein operation of said photosensor can be continued merely by repeating steps (b) and (c) above.

3. The method of operating a photosensor of claim 2 wherein said predetermined electric potential across said second photoconductive region is substantially zero.

4. A photo signal detecting apparatus comprising:
   a first photoconductive region for photoelectrically converting a signal light into first carriers, said first photoconductive region multiplies aid first carriers generated by said signal light;
   a second photoconductive region for photoelectrically converting a reading light into second carriers;
   an intermediate region disposed between the first and the second photoconductive regions, storing charges according to the carriers produced by said first and second photoconductive regions;
   means for applying an electric field to the photoconductive regions toward the intermediate region; and
   an optical source for irradiating the second photoconductive region with the reading light so as to read out charges stored in the intermediate region while it completes preparation of the apparatus for receiving the signal light.

5. A photosensor according to claim 4 wherein said first photoconductive region includes an amorphous semiconductor layer wherein the multiplications of said first carriers may be accomplished by applying the electric field for avalanche multiplications in said amorphous semiconductor to the first photoconductive region.

6. A photosensor according to claim 5 wherein said amorphous semiconductor is comprised mainly of selenium.

* * * * *

UNITED STATES PATENT AND TRADEMARK OFFICE
CERTIFICATE OF CORRECTION

PATENT NO. : 5,196,702
DATED : March 23, 1993
INVENTOR(S) : Tsuji Kazutaka et al It is certified that error appears in the above-indentified patent and that said Letters Patent is hereby corrected as shown below:

Column 1, line 32, after "beam" insert --like--.
Column 6, line 49, change "he" to --the--.
Column 7, line 49, after "signals" insert --that--.
Column 14, line 14, change "produced" to --produce--.
Column 15, line 2, after "carriers" change "a" to --as--.
Column 15, line 7, change "20" to --200--.
Column 17, line 53, change "40  m" to --50 um--.
Column 25, line 59, change "CeO₃" to CeO₂--.
Column 27, line 7, change "These" to --This--.
Column 30, line 32, hange "aid" to --said--.

Signed and Sealed this

Twenty-eighth Day of June, 1994

Attest:

BRUCE LEHMAN

*Attesting Officer*    Commissioner of Patents and Trademarks